US012591738B2

(12) United States Patent
Singh et al.

(10) Patent No.: US 12,591,738 B2
(45) Date of Patent: Mar. 31, 2026

(54) AUTOCORRECT CANDIDATE SELECTION

(71) Applicant: Microsoft Technology Licensing, LLC, Redmond, WA (US)

(72) Inventors: Aman Singh, Dublin (IE); James Cogley, Dublin (IE); Andrew Donohoe, Dublin (IE); Enrico Cadoni, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 18/173,402

(22) Filed: Feb. 23, 2023

(65) Prior Publication Data

US 2024/0289549 A1 Aug. 29, 2024

(51) Int. Cl.
*G06F 40/253* (2020.01)
*G06F 40/166* (2020.01)
(52) U.S. Cl.
CPC .......... *G06F 40/253* (2020.01); *G06F 40/166* (2020.01)
(58) Field of Classification Search
CPC ...... G06F 40/166; G06F 40/253; G06F 40/30; G06F 40/58; G10L 15/01
See application file for complete search history.

(56) References Cited

U.S. PATENT DOCUMENTS 12,079,571 B2 * 9/2024 Mansour ................ G06Q 50/01
2019/0311031 A1 * 10/2019 Powell .................. G06F 40/253
2020/0372105 A1 * 11/2020 Gerges .................. G06F 40/232
2020/0409474 A1 * 12/2020 Mannby ................ G06F 3/0237
2022/0198137 A1 * 6/2022 Lai ......................... G06F 40/194

FOREIGN PATENT DOCUMENTS

EP        2891076 A1    7/2015
WO    2013052629 A1    4/2013

OTHER PUBLICATIONS

International Search Report and Written Opinion received for PCT Application No. PCT/US24/015891 May 31, 2024, 12 pages.
International Preliminary Report on Patentability received for PCT Application No. PCT/US24/015891, mailed on Sep. 4, 2025, 07 pages.

* cited by examiner

*Primary Examiner* — Richemond Dorvil
(74) *Attorney, Agent, or Firm* — Novo TechIP International PLLC

(57) ABSTRACT

A data processing system implements receiving textual content from a first application on a first client device associated with a first user for analysis by a writing assistant configured to provide suggestions for improving the textual content. The textual content is analyzed by one or more NLP models configured to receive the textual content as an input and to provide candidate suggestions for correcting errors and/or otherwise improving the textual content. The candidate suggestions are associated with a suggestion category, and a determination is made by an autocorrection model whether autocorrection is appropriate for the suggestion category. The textual content is autocorrected based on those candidate suggestions for which autocorrection is appropriate while the remainder of the candidate suggestions may be presented to the user for approval prior to applying the candidate suggestions to the textual content.

18 Claims, 16 Drawing Sheets

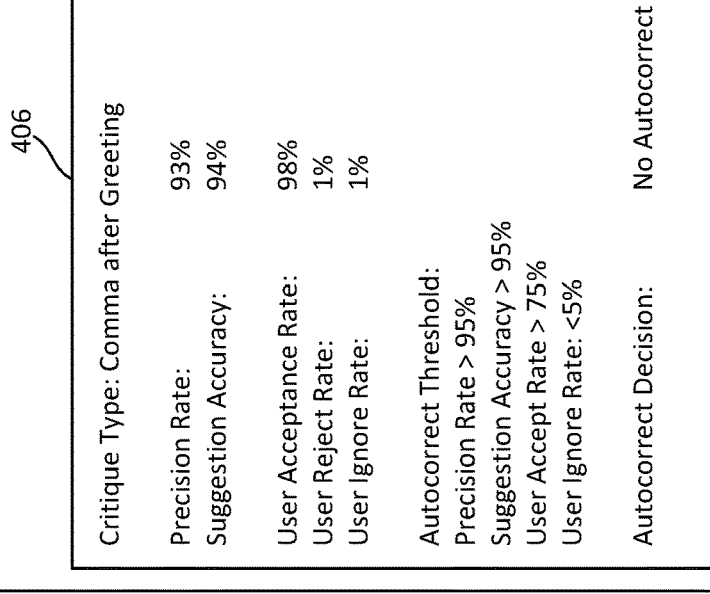

Critique Type: Comma after Greeting

Precision Rate:                              93%
Suggestion Accuracy:                    94%

User Acceptance Rate:                   98%
User Reject Rate:                           1%
User Ignore Rate:                           1%

Autocorrect Threshold:
Precision Rate > 95%
Suggestion Accuracy > 95%
User Accept Rate > 75%
User Ignore Rate: <5%

Autocorrect Decision:              No Autocorrect

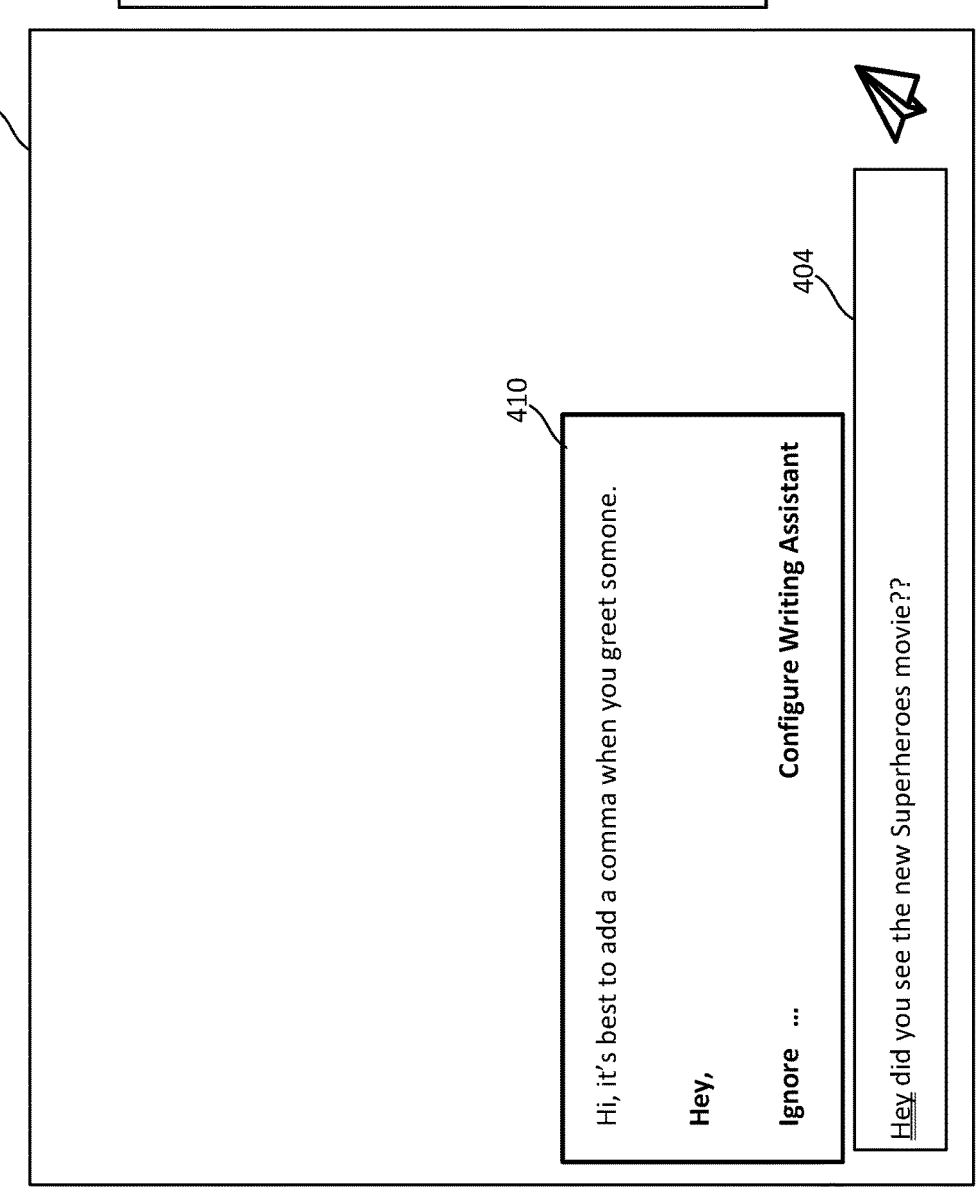

Hi, it's best to add a comma when you greet somone.

Hey,

Ignore   ...

Configure Writing Assistant

Hey did you see the new Superheroes movie??

FIG. 4C

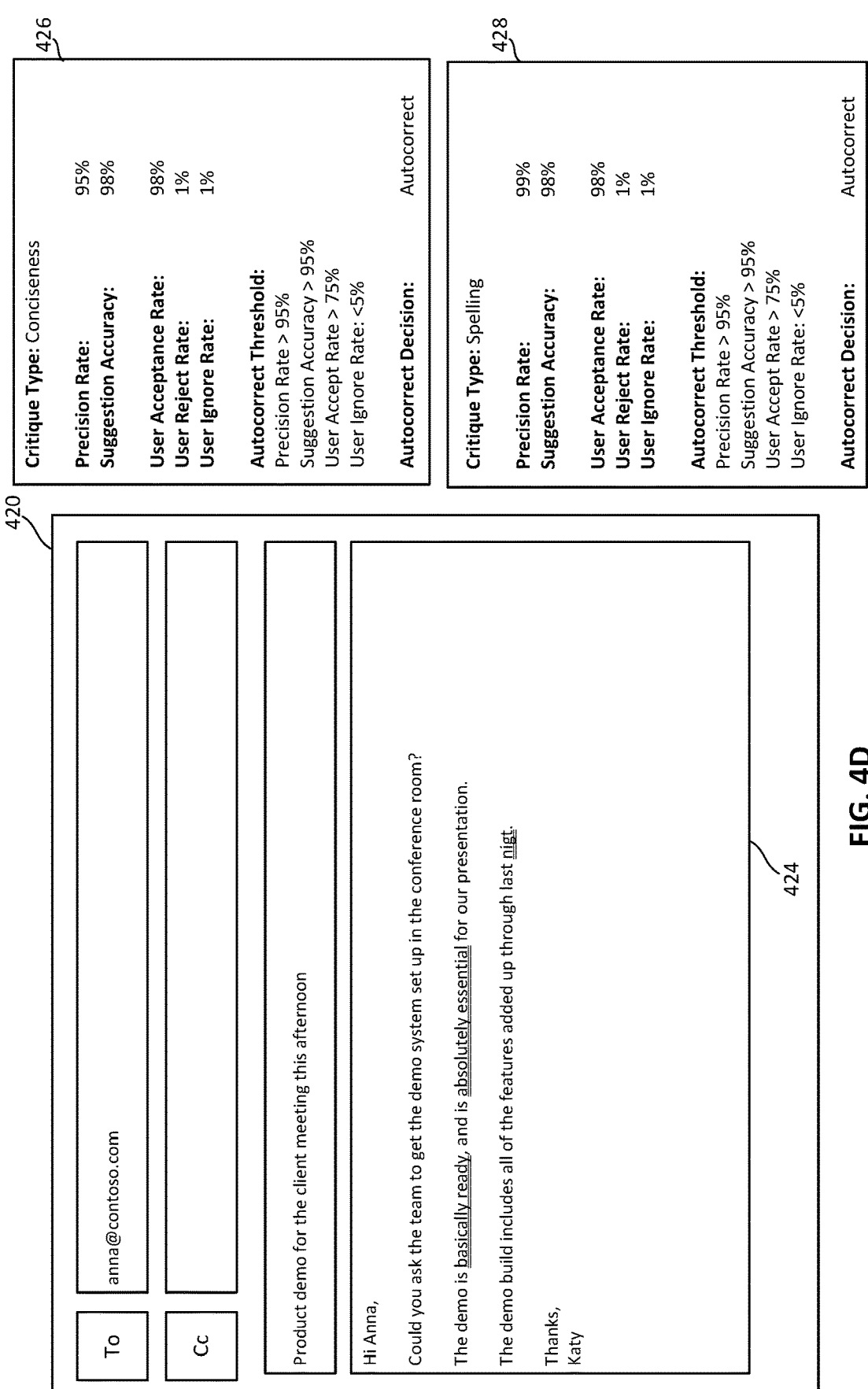

Critique Type: Conciseness

| | |
|---|---|
| Precision Rate: | 95% |
| Suggestion Accuracy: | 98% |
| | |
| User Acceptance Rate: | 98% |
| User Reject Rate: | 1% |
| User Ignore Rate: | 1% |
| | |
| Autocorrect Threshold: | |
| Precision Rate > 95% | |
| Suggestion Accuracy > 95% | |
| User Accept Rate > 75% | |
| User Ignore Rate: <5% | |
| | |
| Autocorrect Decision: | Autocorrect |

Critique Type: Spelling

| | |
|---|---|
| Precision Rate: | 99% |
| Suggestion Accuracy: | 98% |
| | |
| User Acceptance Rate: | 98% |
| User Reject Rate: | 1% |
| User Ignore Rate: | 1% |
| | |
| Autocorrect Threshold: | |
| Precision Rate > 95% | |
| Suggestion Accuracy > 95% | |
| User Accept Rate > 75% | |
| User Ignore Rate: <5% | |
| | |
| Autocorrect Decision: | Autocorrect |

To: anna@contoso.com

Cc:

Product demo for the client meeting this afternoon

Hi Anna,

Could you ask the team to get the demo system set up in the conference room?

The demo is basically ready, and is absolutely essential for our presentation.

The demo build includes all of the features added up through last nigt.

Thanks,
Katy

Figure 4G:
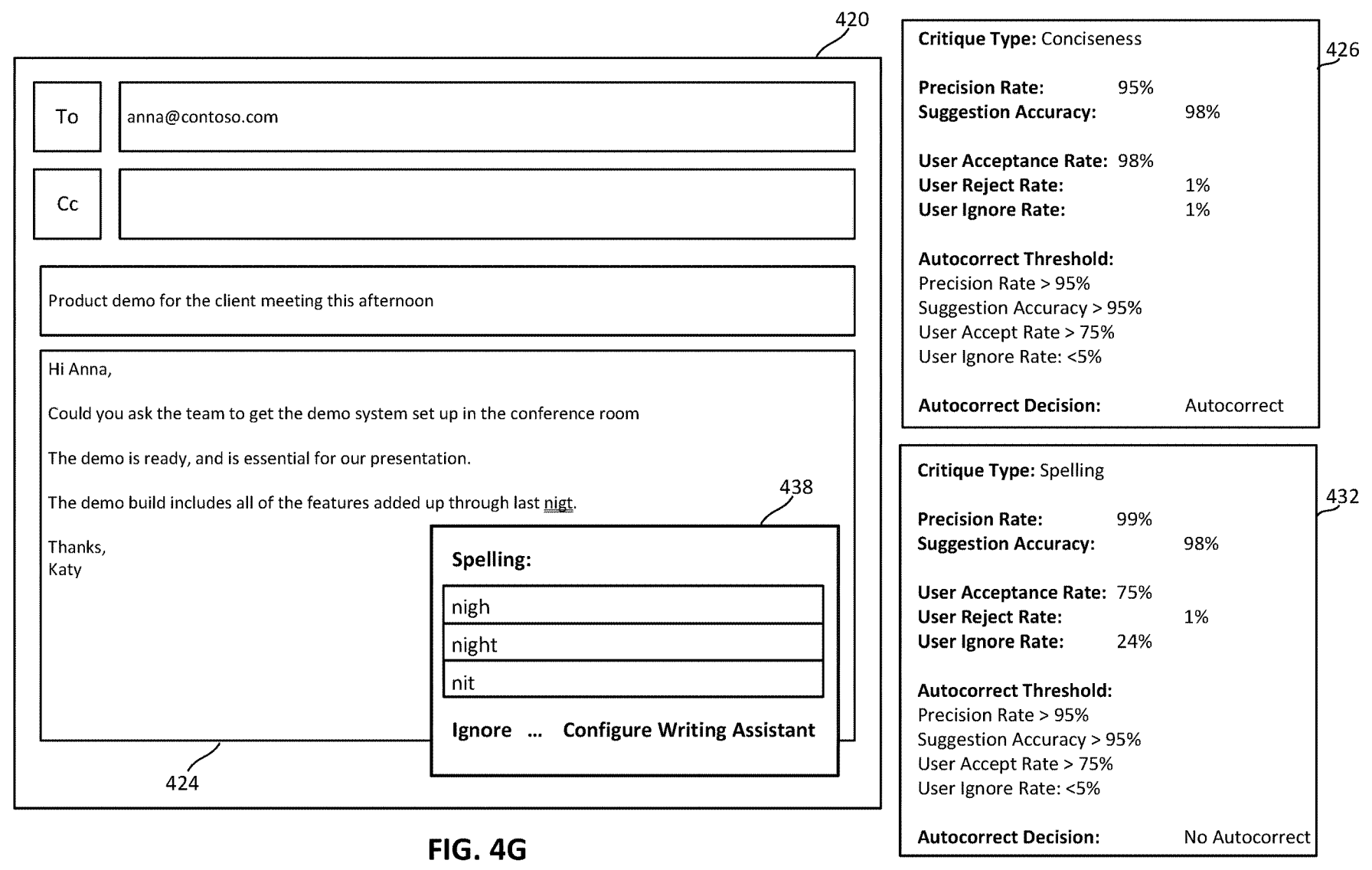

Critique Type: Conciseness

| | |
|---|---|
| Precision Rate: | 95% |
| Suggestion Accuracy: | 98% |
| User Acceptance Rate: | 98% |
| User Reject Rate: | 1% |
| User Ignore Rate: | 1% |

Autocorrect Threshold:
Precision Rate > 95%
Suggestion Accuracy > 95%
User Accept Rate > 75%
User Ignore Rate: <5%

Autocorrect Decision:     Autocorrect

432

Critique Type: Spelling

| | |
|---|---|
| Precision Rate: | 99% |
| Suggestion Accuracy: | 98% |
| User Acceptance Rate: | 75% |
| User Reject Rate: | 1% |
| User Ignore Rate: | 24% |

Autocorrect Threshold:
Precision Rate > 95%
Suggestion Accuracy > 95%
User Accept Rate > 75%
User Ignore Rate: <5%

Autocorrect Decision:     No Autocorrect

420

| To | anna@contoso.com |
|---|---|
| Cc | |

Product demo for the client meeting this afternoon

Hi Anna,

Could you ask the team to get the demo system set up in the conference room

The demo is ready, and is essential for our presentation.

The demo build includes all of the features added up through last nigt.

438

Spelling:

nigh night nit

Ignore   ...   *Configure Writing Assistant*

Thanks,
Katy

User Feedback

{category001, 1}

{category001, 0}

{category001, 2}

{category001, 1}

{category002, 1}

510

| Suggestion Category | User Response Indicator | Timestamp |
|---|---|---|
| category001 | 1 | 2023-01-13 12:12:01PST |
| category001 | 0 | 2023-01-13 12:22:51PST |
| category001 | 2 | 2023-01-14 09:54:03PST |
| category001 | 1 | 2023-01-15 12:12:01PST |
| category002 | 1 | 2023-01-15 17:44:32PST |

515

| Suggestion Category | Total | Accept | Reject | Ignore |
|---|---|---|---|---|
| category001 | 4 | 2 | 1 | 1 |
| category002 | 1 | 1 | 0 | 0 |

| Suggestion Category | Total | Accept | Reject | Ignore |
|---|---|---|---|---|
| category001 | 4 | 50% | 25% | 25% |
| category001 | 10 | 70% | 20% | 10% |

| Suggestion Category | Precision Rate | Suggestion Accuracy |
|---|---|---|
| category001 | 92% | 91% |
| category002 | 94% | 97% |

| Suggestion Category | Autocorrection Permitted |
|---|---|
| category001 | Yes |
| category002 | No |
| category003 | No |

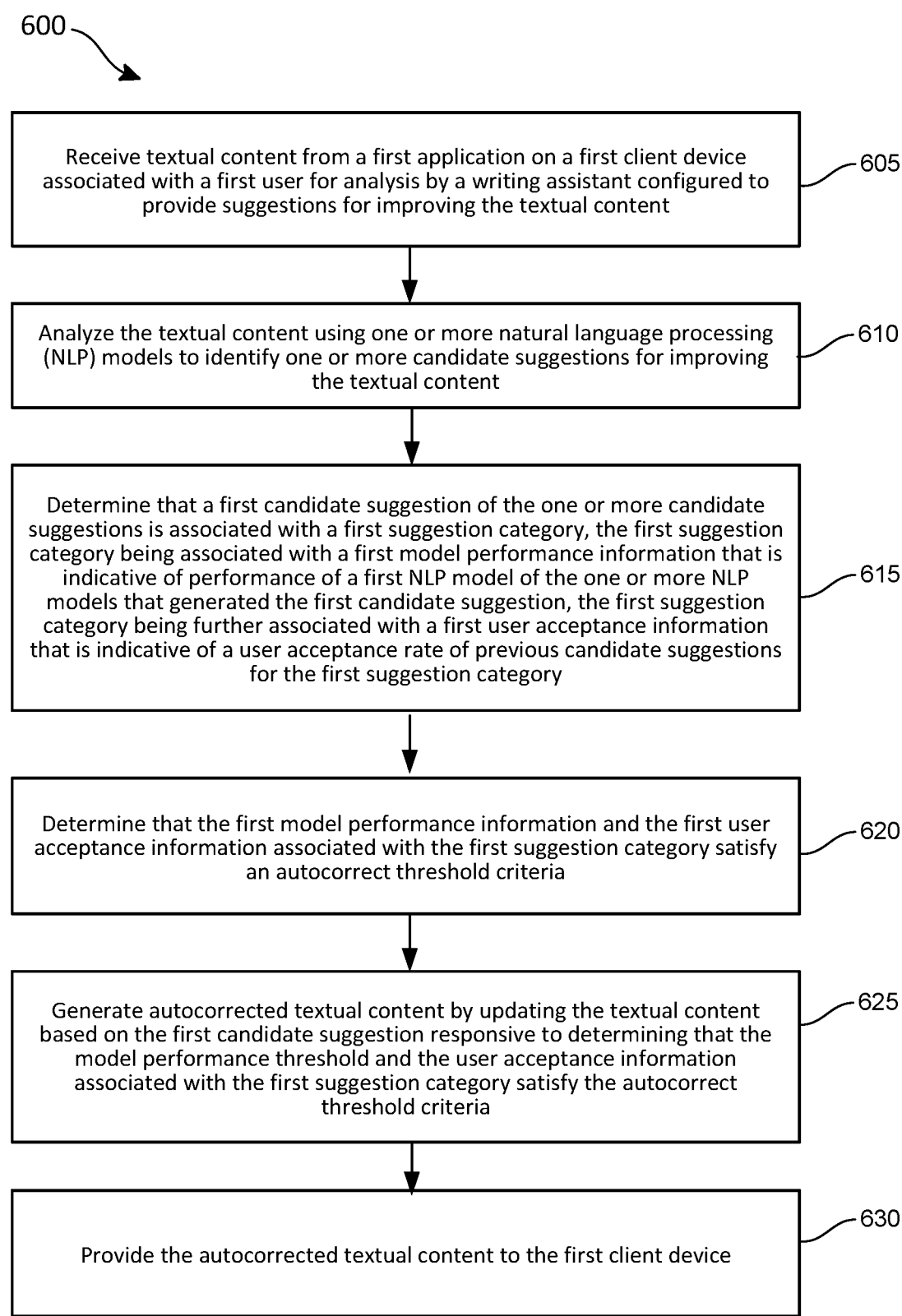

Receive textual content from a first application on a first client device associated with a first user for analysis by a writing assistant configured to provide suggestions for improving the textual content ⟋605

Analyze the textual content using one or more natural language processing (NLP) models to identify one or more candidate suggestions for improving the textual content ⟋610

Determine that a first candidate suggestion of the one or more candidate suggestions is associated with a first suggestion category, the first suggestion category being associated with a first model performance information that is indicative of performance of a first NLP model of the one or more NLP models that generated the first candidate suggestion, the first suggestion category being further associated with a first user acceptance information that is indicative of a user acceptance rate of previous candidate suggestions for the first suggestion category ⟋615

Determine that the first model performance information and the first user acceptance information associated with the first suggestion category satisfy an autocorrect threshold criteria ⟋620

Generate autocorrected textual content by updating the textual content based on the first candidate suggestion responsive to determining that the model performance threshold and the user acceptance information associated with the first suggestion category satisfy the autocorrect threshold criteria ⟋625

Provide the autocorrected textual content to the first client device ⟋630

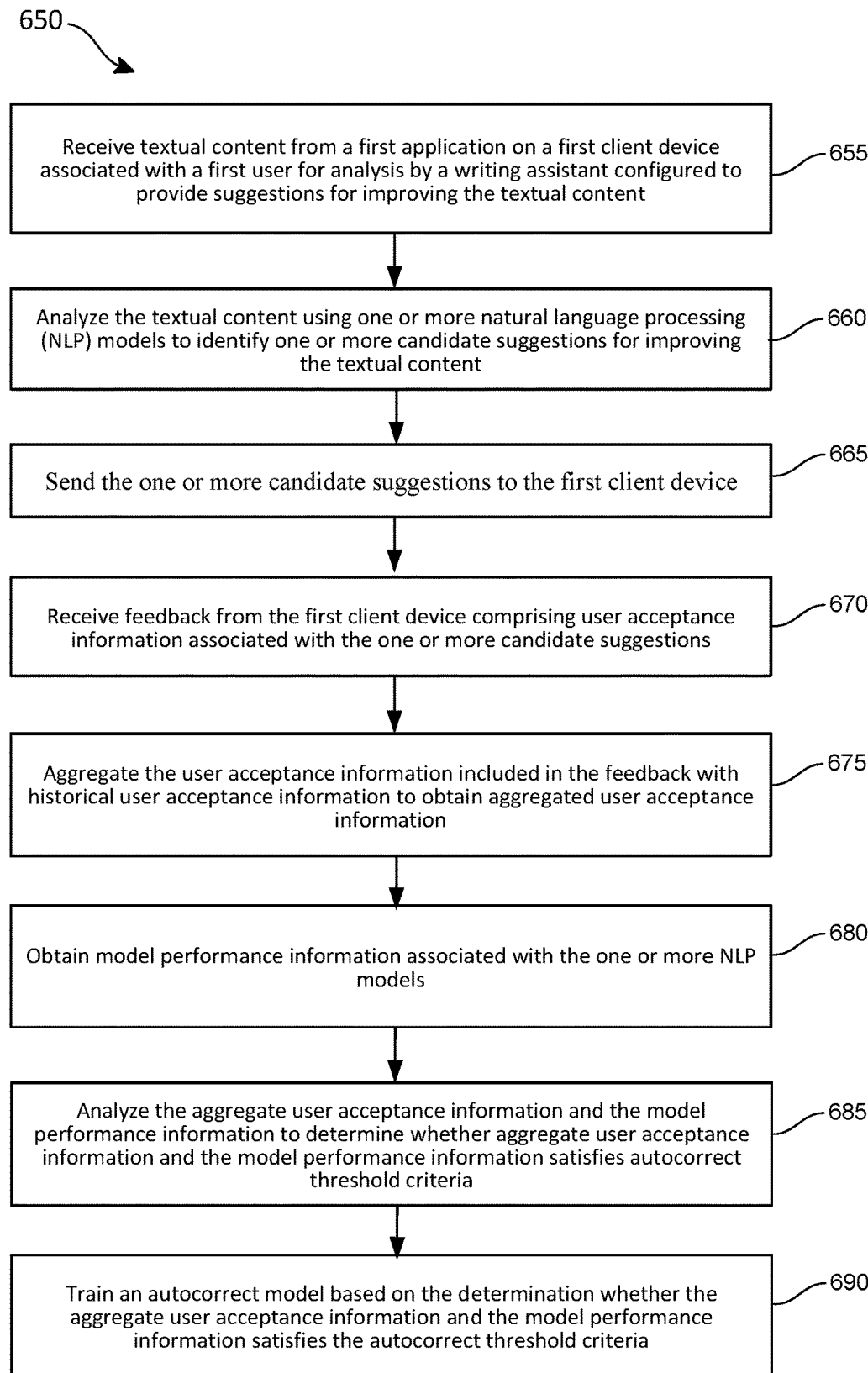

Receive textual content from a first application on a first client device associated with a first user for analysis by a writing assistant configured to provide suggestions for improving the textual content —655

Analyze the textual content using one or more natural language processing (NLP) models to identify one or more candidate suggestions for improving the textual content —660

Send the one or more candidate suggestions to the first client device —665

Receive feedback from the first client device comprising user acceptance information associated with the one or more candidate suggestions —670

Aggregate the user acceptance information included in the feedback with historical user acceptance information to obtain aggregated user acceptance information —675

Obtain model performance information associated with the one or more NLP models —680

Analyze the aggregate user acceptance information and the model performance information to determine whether aggregate user acceptance information and the model performance information satisfies autocorrect threshold criteria —685

Train an autocorrect model based on the determination whether the aggregate user acceptance information and the model performance information satisfies the autocorrect threshold criteria —690

FIG. 6B

AUTOCORRECT CANDIDATE SELECTION

BACKGROUND

Various automated tools exist for proofreading textual content of electronic documents and for providing suggestions to improve the grammar, spelling, vocabulary, punctuation, or other aspects of the textual content. Typically, these tools present these suggestions to the user, and the user can accept, reject, or ignore these suggestions. However, presenting such suggestions and receiving feedback from the user can interrupt the user workflow. In contrast, other tools automatically correct the textual content of the electronic contents to implement these suggestions. But the user may not have wanted and/or agreed with the automated correction and would have to manually undo the automated correction. Consequently, the autocorrect feature can become intrusive, interrupt the workflow, and degrade the user experience making autocorrections where they are not deemed to be helpful by the user. Hence, there is a need for improved systems and methods that provide a technical solution for implementing a context adaptive writing assistant that adapts when autocorrect is applied.

SUMMARY

An example data processing system according to the disclosure may include a processor and a machine-readable medium storing executable instructions. The instructions when executed cause the processor to perform operations including receiving textual content from a first application on a first client device associated with a first user for analysis by a writing assistant configured to provide suggestions for improving the textual content; analyzing the textual content using one or more natural language processing (NLP) models to identify one or more candidate suggestions for improving the textual content; determining that a first candidate suggestion of the one or more candidate suggestions is associated with a first suggestion category, the first suggestion category being associated with a first model performance information that is indicative of performance of a first NLP model of the one or more NLP models that generated the first candidate suggestion, the first suggestion category being further associated with a first user acceptance information that is indicative of a user acceptance rate of previous candidate suggestions for the first suggestion category; determining that the first model performance information and the first user acceptance information associated with the first suggestion category satisfy an autocorrect threshold criteria; generating autocorrected textual content by updating the textual content based on the first candidate suggestion responsive to determining that the model performance threshold and the user acceptance information associated with the first suggestion category satisfy the autocorrect threshold criteria; and providing the autocorrected textual content to the first client device.

An example data processing system according to the disclosure may include a processor and a machine-readable medium storing executable instructions. The instructions when executed cause the processor to perform operations including receiving textual content from a first application on a first client device associated with a first user for analysis by a writing assistant configured to provide suggestions for improving the textual content; analyzing the textual content using one or more natural language processing (NLP) models to identify one or more candidate suggestions for improving the textual content; causing the first application of the first client device to display the one or more candidate suggestions; receiving feedback from the first client device comprising user acceptance information associated with the one or more candidate suggestions; aggregating the user acceptance information included in the feedback with historical user acceptance information to obtain aggregated user acceptance information; obtaining model performance information associated with the one or more NLP models; analyzing the aggregate user acceptance information and the model performance information to determine whether aggregate user acceptance information and the model performance information satisfies autocorrect threshold criteria; and training an autocorrect model based on the determination whether the aggregate user acceptance information and the model performance information satisfies the autocorrect threshold criteria.

An example method implemented in a data processing system for providing suggestions for improving textual content includes receiving textual content from a first application on a first client device associated with a first user for analysis by a writing assistant configured to provide suggestions for improving the textual content; analyzing the textual content using one or more natural language processing (NLP) models to identify one or more candidate suggestions for improving the textual content; determining that a first candidate suggestion of the one or more candidate suggestions is associated with a first suggestion category, the first suggestion category being associated with a first model performance information that is indicative of performance of a first NLP model of the one or more NLP models that generated the first candidate suggestion, the first suggestion category being further associated with a first user acceptance information that is indicative of a user acceptance rate of previous candidate suggestions for the first suggestion category; determining that the first model performance information and the first user acceptance information associated with the first suggestion category satisfy an autocorrect threshold criteria; generating autocorrected textual content by updating the textual content based on the first candidate suggestion responsive to determining that the model performance threshold and the user acceptance information associated with the first suggestion category satisfy the autocorrect threshold criteria; and providing the autocorrected textual content to the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4G are diagrams of example user interfaces showing examples of the autocorrect techniques disclosed herein.

FIGS. 5A-5E are examples of data structures that may be used to store data used for various aspects of the autocorrect techniques disclosed herein.

FIG. 6A is a flow chart of an example process for providing autocorrection according to the techniques disclosed herein.

FIG. 6B is a flow chart of an example process for training an autocorrect model, such as that shown in the preceding examples.

DETAILED DESCRIPTION

Figure 1:
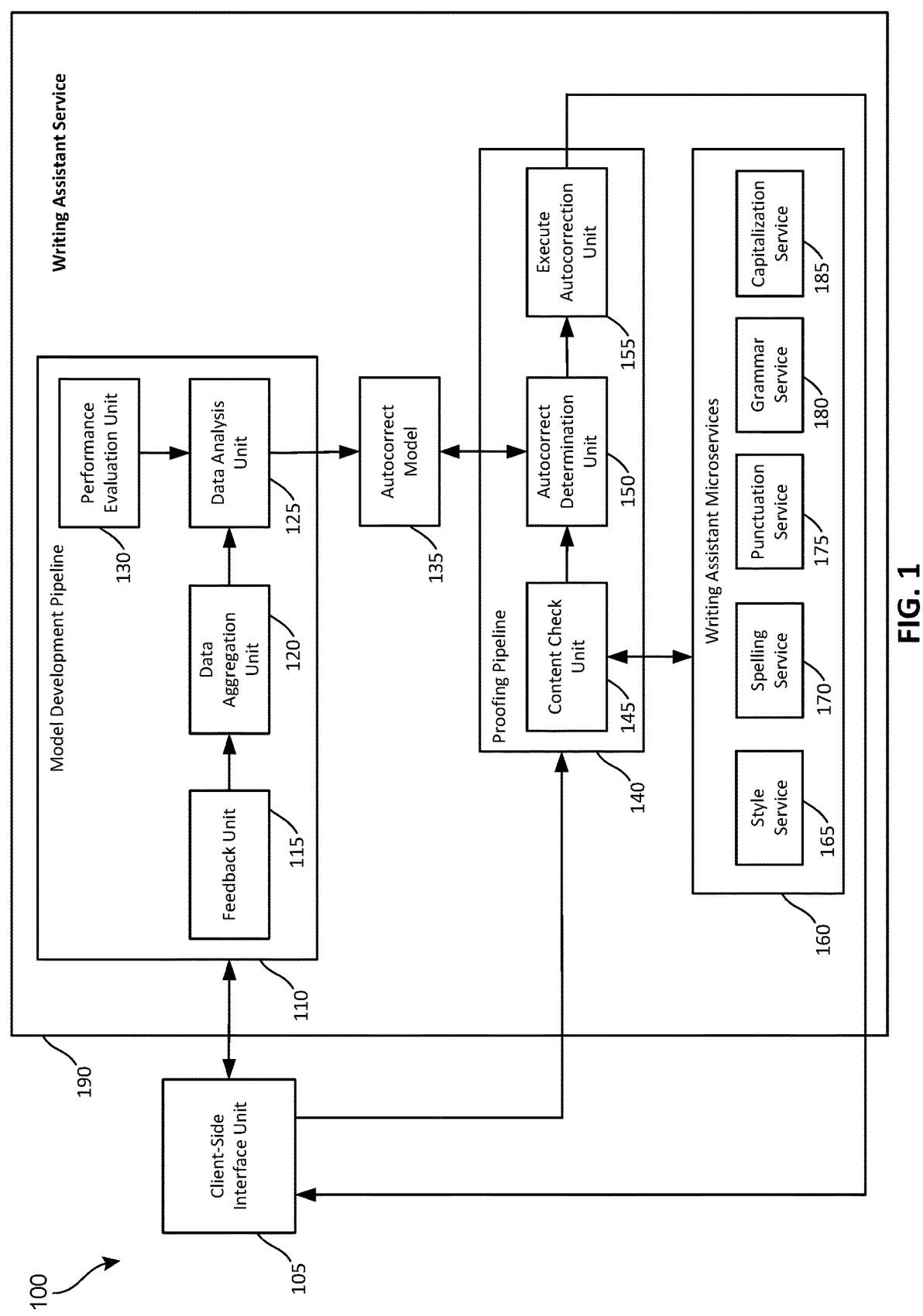
FIG. 1 is a diagram showing an example computing environment in which the techniques disclosed herein for providing a context adaptive writing assistant may be implemented.

Techniques for providing autocorrect candidate selection are provided. These techniques address the technical problems associated with current writing assistant and proofing tools which provide an autocorrect feature to improve the writing of the user. Current writing assistants are designed to provide suggestions for correcting and/or autocorrect certain types of issues detected in the textual content drafted by a user. These issues may include but are not limited to spelling, grammar, punctuation, capitalization, and/or stylistic issues detected by the writing assistant. The suggestions are typically presented to the user via a popup or other user interface element that identifies a portion of text content associated with the suggestion and presents the suggested improvement to the textual content. The user may then choose to accept, reject, or ignore these suggestions. The current writing assistants also implement autocorrection to automatically apply certain types of suggested improvements without user input. Autocorrection, when correctly applied, improves the user workflow and the user experience by assisting the user in automatically improving the textual content being produced. However, the user may not want or agree with the autocorrection in some instances. Consequently, the autocorrect feature can become intrusive, interrupt the workflow, and degrade the user experience by making autocorrections where they are not deemed to be helpful by the user.

The techniques disclosed herein provide a writing assistant that implements autocorrect candidate selection that identifies candidates for autocorrection, makes a determination whether autocorrection is appropriate for each of candidates, and performs the autocorrection for candidates for which autocorrection is appropriate. The autocorrect techniques herein utilize a quantitative approach to determining whether autocorrection is appropriate for a particular scenario by utilizing several criteria for determining when autocorrection is appropriate. These criterial may include model performance information and user acceptance information. The model performance information includes a precision rate and suggestion accuracy. The precision rate is a quantitative measurement that represents the confidence that the suggestion candidate representing an error or potential improvement to the textual content has been correctly detected. The suggestion accuracy is a quantitative measurement that represents the confidence that a suggestion for improving the suggestion candidate is an appropriate suggestion. The user acceptance information indicates whether users have adopted the suggestion in the past when such a suggestion was presented to the users and/or whether users have rejected an autocorrection in which the suggestion was automatically applied for the suggestion candidate in the past. These and/or other factors are used to generate an autocorrect model that determines when to apply autocorrection in a variety of use cases. A technical benefit of this approach is that the user experience and workflow are improved by applying autocorrections that are appropriate for a particular use case. This approach reduces the likelihood that the user will reject the autocorrection and restore the textual content to the state prior to the autocorrect being applied. These and other technical benefits of the techniques disclosed herein will be evident from the discussion of the example implementations that follow.

FIG. 1 is a diagram showing an example computing environment 100 in which the techniques disclosed herein for providing autocorrect candidate selection may be implemented. The computing environment 100 shows various elements associated with an implementation of a writing assistant service 190 that is configured to analyze textual content to detect spelling, grammar, punctuation, capitalization, stylistic issues, and/or other issues with the textual content. The writing assistant service 190 is further configured to provide suggestions for improving these issues that are presented to the user and/or autocorrected by the writing assistant service 190. The textual content is received from a client-side interface unit 105.

The client-side interface unit 105 is implemented on a client device of a user authoring textual content in some implementations. In such implementations, the client-side interface unit 105 may implemented on the client device of a user to provide support for writing assistant services in one or more native applications installed on the client device or may be implemented by a native application to provide support for the writing assistant services for that application. In other implementations, the client-side interface unit 105 is implemented by a cloud-based application service. In such implementations, the client-side interface unit 105 provides support for writing assistant service for one or more web applications available to users of the cloud-based application service. The writing assistant service may provide proofreading and suggestions for textual content being authored and/or modified using native application and web-based applications.

As a user creates or edits textual content in a native application or web-based application, the client-side interface unit 105 provides at least a portion of this textual content to the client-side interface unit 105 for analysis by the writing assistant services 190. The client-side interface unit 105 sends the textual content to the writing assistant service 190 via a network connection. The textual content may include a sentence, multiple sentences, a paragraph, page, or other portion of a textual content to be analyzed. The textual content may be part of an electronic document, an email, a text message, a chat message, and/or other type of electronic content that includes textual content that may be improved by the suggested improvements and/or autocorrections provided by the writing assistant service 190. The specific type of textual content depends on the native application or the web-application from which the textual content has been received. The writing assistant services can be provided to a variety of different types of native applications and/or web-based applications, such as but not limited to word processing applications, collaboration platforms, messaging applications, web browsers, presentation design applications, and/or other types of applications in which the textual content may be authored. In response to sending the textual content to the writing assistant service 190, the client-side interface unit 105 receives suggestions from the writing assistant service 190 that may be presented to the user via a user interface of an application and/or autocorrects to be automatically applied to the textual content without involving the user.

The client-side interface unit 105 is also configured to provide feedback to the writing assistant service 190 regarding the suggestions and/or autocorrections provided. With regard to suggestions, the user may choose to accept the suggestion, reject the suggestion, or simply ignore the rejection. The native application or web-application provides a user interface the provides controls, which enable the user to accept, reject, or ignore the suggestions provided by the writing assistant service 190. The user interface also provides an indication of the user selection to the client-side interface unit 105, which sends this indication to the writing assistant service 190 for processing by the model development pipeline 110. This information is used to train and/or fine-tune the training of the autocorrect model 135.

The writing assistant service 190 includes a model development pipeline 110, a proofing pipeline 140, the autocorrect model 135, and the writing assistant microservices 160. The model development pipeline 110 is used to train and/or fine-tune the training of the autocorrect model 135 the autocorrect model 135 used by the writing assistant service 190 to make decisions whether autocorrection is appropriate for a particular issue identified in textual content. The proofing pipeline 140 is configured to analyze textual content to identify candidate suggestions for improving the textual content and for making autocorrection determinations regarding these candidate suggestions. The writing assistant microservices 160 are configured to analyze the textual content and to provide the suggestions for improving the textual content.

Figures 5A, 5B:
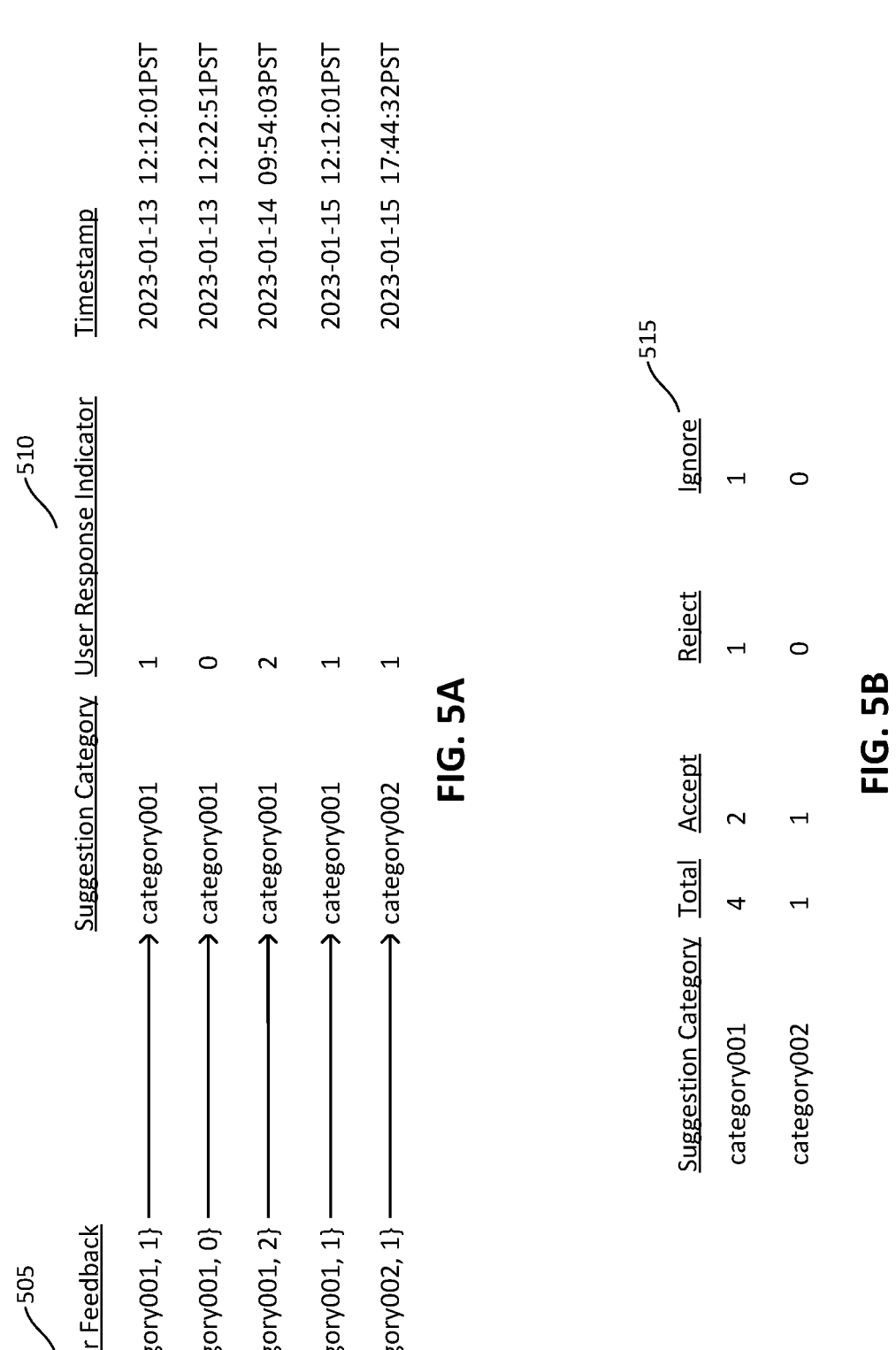

The model development pipeline 110 includes a feedback unit 115, a data aggregation unit 120, a data analysis unit 125, and a performance evaluation unit 130. The feedback unit 115 is configured to receive the feedback provided by the client-side interface unit 105 whether a user has accepted, rejected, or ignored a suggestion from the writing assistant service 190. The feedback includes an identifier of the suggestion category associated with the suggestion for which feedback is being provided and a user response indicator indicating whether the user accepted, rejected, or ignored the suggestion. The indications provided by the client-side unit 105 do not include any user specific information that could be associated with a particular user to avoid any privacy concerns associated with collecting such information from the users. The information collected is used to improve the determinations whether a particular category of suggestion may be autocorrected or should instead be presented to the user for consideration. The data aggregation unit 120 is configured to aggregate the data received by the feedback unit 115 by suggestion type. The data may be aggregated in a variety of ways. In some implementations, the data associated with each suggestion type is aggregated into a running total of the number of suggestions presented to the user and the respective number of accept, reject, and ignore responses associated with these suggestions. The sums of the accept, reject, and ignore responses are expressed in terms of percentages in some implementations. An example of aggregated user data by such an aggregation process is shown in FIGS. 5B and 5C, which are discussed in detail in the examples which follow. In some implementations, the feedback unit 115 writes the feedback to the feedback data structure shown in FIG. 5A, and the data aggregation unit 120 is configured to read the data from this data structure to determine the cumulative values shown in the data structures shown in FIGS. 5B and 5C.

The performance evaluation unit 130 is configured to obtain information that indicative of the precision rate and the suggestion accuracy associated with a particular suggestion category. The suggestions for improving the textual content are generated by the writing assistant microservices 160 in the example shown in FIG. 1. The writing assistant microservices include a style service 165, a spelling service 170, a punctuation service 175, a grammar service 180, and a capitalization service 185, which are each configured to identify certain types of issues in the textual content and to provide a suggestion for correcting these issues. The precision rate and suggestion accuracy of the suggestions provided by each of these microservices may be determined in various ways. In some implementations, the precision rate and the suggestion accuracy of the suggestions provided are determined by providing the microservices with a set of reference data and determining how closely the results provided by the microservices conform with expected results based on the reference data. In some implementations, the precision rate and suggestion accuracy determined for each category of suggestion is stored in the data structure shown in FIG. 5D, which is described in greater detail in the examples which follow.

The data analysis unit 125 combines the data received from the data aggregation unit 120 and the performance evaluation unit 130. The data analysis unit 125 is configured to determine whether the precision rate, suggestion accuracy, and the acceptance rate associated with a particular category of suggestion exceeds an autocorrection threshold. The autocorrection threshold sets minimum values for the precision rate, the suggestion accuracy, and minimum or maximum values for one or more user factors that must be satisfied for a particular suggestion category in order for autocorrection to be performed by the writing assistant service 190 for that suggestion category. In some implementations, the user factors provides a minimum user acceptance threshold percentage and/or a maximum user ignore percentage threshold. Autocorrection can be performed if the precision rate associated with the suggestion category satisfies the precision rate threshold, the suggestion accuracy associated with the suggestion category satisfies the suggestion accuracy threshold, and the one or more user factor thresholds are also satisfied. In some implementations, the same autocorrection threshold is applied to all of the suggestion categories. In other implementations, different autocorrection thresholds can be associated with different suggestion categories. The autocorrection thresholds are configurable by an administrator or administrators of the writing assistant service 190. Furthermore, changes to the autocorrection thresholds and/or the aggregated user data associated with a particular suggestion category can trigger the data analysis unit 125 to reassess whether autocorrection is appropriate for that suggestion category.

The data analysis unit 125 is configured to update the autocorrect model 135 in response to determining whether autocorrection is appropriate for a particular suggestion category. The data analysis unit 125 is configured to update the autocorrect model 135 to recognize that autocorrection is appropriate for a particular suggested category by updating the autocorrect model. How the updating is implemented depends upon the particular implementation of the autocorrect model 135.

In some implementations, the autocorrect model 135 is implemented as a rules-based model that is configured to provide a determination whether a specified suggestion category is a suggestion category for which the writing assistant service 190 can autocorrect issues in the textual content. In some implementations, the data analysis unit 125 adds or updates a rule of the autocorrect model 135 in response to determining whether the autocorrection is appropriate for a particular suggestion category. The data analysis unit 125 is configured to store the rules in a data structure similar to that shown in FIG. 5E in some implementations. By default, autocorrection is not permitted for each autocorrection category. However, in response to the data analysis unit 125 determining that autocorrection is permitted for a particular suggestion category, the data structure 530 shown in FIG. 5E is updated to indicate that the autocorrection is permitted for that suggestion category. Similarly, in response to the data analysis unit 125 determining that autocorrection is not permitted for a particular suggestion category, the data structure shown in FIG. 5E is updated to indicate that the autocorrection is not permitted for that suggestion category. When the autocorrect model 135 receives a request from the autocorrect determination unit 150 whether a suggestion category associated with a candidate suggestion may be autocorrected by the writing assistant service 190, the autocorrect model 135 accesses the data structure 530 to determine whether the autocorrection is permitted. In some implementations, the data structure 530 may be sparsely populated, meaning that records for a particular suggestion category are only added as feedback is received and analyzed by the model development pipeline 110. In such implementations, if no record exists in the data structure 530 for the suggestion category, the autocorrect model 135 returns a determination that autocorrection is not permitted for that suggestion category. As discussed above, the data in the data structure 530 may continue to be updated by the model development pipeline 110 as feedback is received from users via the client-side interface unit 105 and this feedback is processed by the model development pipeline 110.

In some implementations, the autocorrect model 135 is implemented as machine learning model that is configured to classify the candidate suggestions as being allowable or non-allowable based on the suggestion category. In some implementations, the data analysis unit 125 is configured to generate training data that associates a suggestion category with an indication whether autocorrection is permitted.

The proofing pipeline 140 is used to analyze textual content received from the client-side interface unit 105, to identify candidate suggestions for improving the textual content, and to determine whether autocorrection is appropriate for each candidate suggestion. The proofing pipeline 140 sends autocorrection text to the client-side interface unit 105 for candidate suggestions for which autocorrection is predicted to be appropriate. The proofing pipeline 140 includes a content check unit 145, an autocorrect determination unit 150, and execute autocorrection unit 155.

The content check unit 145 is configured to receive the textual content provided by the client-side interface unit 105 and to submit the textual content to the writing assistant microservices 160 for analysis. The writing assistant microservices 160 analyze the textual content to obtain candidate suggestions for improving the textual content. The content check unit 145 provides the candidate suggestions to the autocorrect determination unit 150. For each of the candidate suggestions, the autocorrect determination unit 150 queries the autocorrect model with the suggestion category associated with the candidate suggestion to the autocorrect model to obtain a determination whether the writing assistant service 190 is permitted to autocorrect textual content with the candidate suggestion. The autocorrect determination unit 150 provides the candidate suggestions and the autocorrection indicator for that candidate suggestion to the execute autocorrection unit 155. The autocorrection indicator indicates whether autocorrection is authorized.

For each candidate suggestion, the execute autocorrection unit 155 autocorrects the textual input according to the candidate suggestion if the autocorrection indicator indicates autocorrection is authorized. The execute autocorrection unit 155 autocorrects the textual content by updating the textual content according to the candidate suggestion. If the candidate suggestion is a spelling related issue, the execute autocorrection unit 155 updates the textual content with the corrected spelling provided in the candidate suggestion. The execute autocorrection unit 155 similarly updates the textual content to correct grammar, stylistic issues, punctuation, capitalization, and/or other type of issues associated with other categories of candidate suggestions. In some instances, textual content is associated with multiple candidate suggestions for which autocorrection is authorized, and the execute autocorrection unit 155 updates the textual content according to each of these candidate selections. The autocorrected textual content is sent to the client-side interface unit 105, which is configured to cause the native application or web-based application to replace the textual content at the application with the autocorrected textual content. The client-side interface unit 105 is configured to determine whether the original textual content has been modified at the native application or web-based application since the textual content was sent to the writing assistant service 190 for processing. The client-side interface unit 105 discards the autocorrected textual content if the original textual content has been modified and resubmits the modified textual content from the native application or web-based application for processing. This safeguard ensures that change that were introduced by the user at the native application or web-based application are not lost by replacing the modified textual content with the autocorrected textual content.

The execute autocorrection unit 155 sends the candidate suggestions that cannot be autocorrected to the client-side interface 105 for presentation to the user. The candidate suggestions include offset information and/or other information that can be used by the client-side user interface 105 and/or the native application or web-based application to present the candidate suggestions to the user. In instances in which some of the candidate selections may be autocorrected and others cannot be autocorrected by the writing assistant service 190, the execute autocorrection unit 155 executes the autocorrections for the candidate suggestions for which autocorrections are permitted and sends the auto-corrected textual content and the remaining candidate suggestions to the client-side interface unit 105. The execute autocorrection unit 155 updates the offset information and/or other information that can be used by client-side user interface 105 and/or the native application or web-based application to present the candidate suggestions to the user based on the autocorrected textual content so that the candidate suggestions align with the autocorrected textual content when presented by the native application or web-based application.

The writing assistant microservices 160 are implemented by one or more cloud-based services accessible to the client devices of users via a network connection. In the example implementation shown in FIG. 1, the writing assistant microservices 160 include a style service 165, a spelling service 170, a punctuation service 175, a grammar service 180, and a capitalization service 185. However, other implementations may include a different number of such microservices. Furthermore, in some implementations, the functionality of two or more of these microservices may be combined into a single microservice. The writing assistant microservices 160 utilize natural language processing (NLP) models trained to analyze a textual input and to output suggestions for improving the textual input in some implementations.

Figure 2:
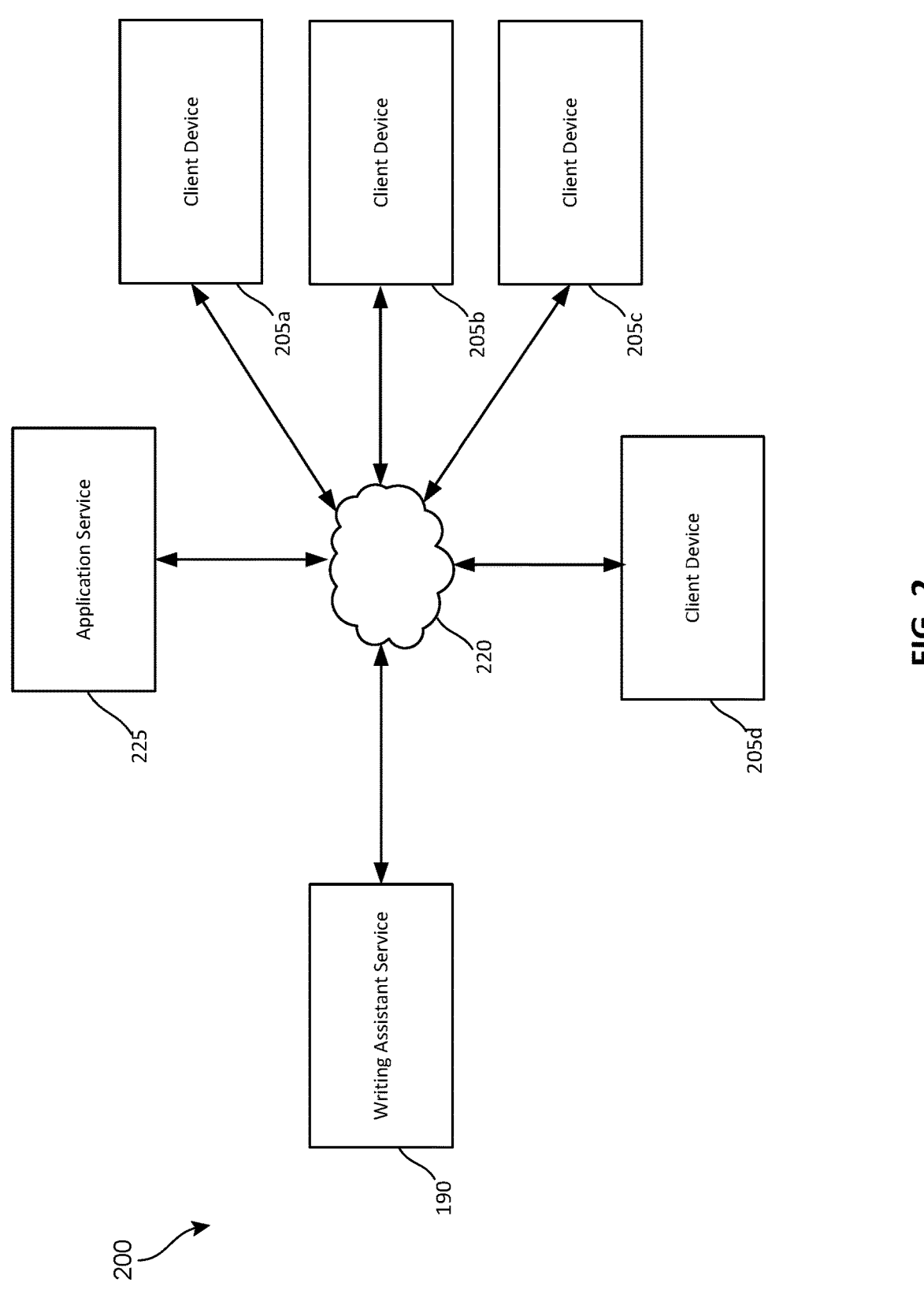
FIG. 2 is a diagram showing another example computing environment in which the techniques disclosed herein may be implemented.

FIG. 2 is a diagram showing an example computing environment 200 in which the techniques disclosed herein for providing writing assistant services may be implemented. The computing environment 200 includes a writing assistant service 190. The example computing environment 200 also includes client devices 205*a*, 205*b*, 205*c*, and 205*d* (collectively referred to as client device 205) and application services 225. The client devices 205*a*, 205*b*, 205*c*, and 205*d* communicate with the writing assistant service 190 and/or the application service 225 via the network 220. Furthermore, the application service 225 communicates with the writing assistant service 190 via the network 220. The network 220 may be a combination of one or more public and/or private networks and may be implemented at least in part by the Internet.

In the example shown in FIG. 2, the writing assistant service 190 is implemented as a cloud-based service or set of services. The writing assistant service 190 implements the functionality for providing suggestions for improving textual content and/or for autocorrecting the textual content according to these suggestions as discussed with regard to FIG. 1.

The writing assistant service 190 is configured to writing assistant services to applications provided by the application service 225 and/or for native applications on the client devices 205*a*-205*d*. The applications of the application service 225 and/or the client devices 205*a*-205*d* send textual content being authored or edited in the application to the writing assistant service 190. As discussed in the preceding examples, the writing assistant service 190 can provide writing assistant functionality to a variety of different types of applications on the client device, such as but not limited to word processing applications, collaboration platforms, messaging applications, web browsers, presentation design applications, and/or other types of applications in which the textual content may be authored. The textual content may include text from a word processing document, a presentation, a text message, an email message, a chat message, and/or other type of textual content.

The application service 225 provides cloud-based software and services that are accessible to users via the client devices 205*a*-205*d*. The application service 225 provides one or more software applications, including but not limited to communications platform and/or collaboration platform, a word processing application, a presentation design application, and/or other types of applications in which the user may create and/or access textual content. The textual content may be stored on the writing assistant service 190 and/or the client devices 205*a*-205*d*. The term "textual content" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, program code, presentations, websites (e.g., Microsoft SharePoint® sites), digital drawings, media files, components thereof, and the like. The one or more software applications provided by the application service 225 are configured to utilize the services provided by the writing assistant service 190 to analyze the textual content and provide suggestions for improving the textual content.

The client devices 205*a*, 205*b*, 205*c*, and 205*d* are each a computing device that may be implemented as a portable electronic device, such as a mobile phone, a tablet computer, a laptop computer, a portable digital assistant device, a portable game console, and/or other such devices. The client devices 205*a*, 205*b*, 205*c*, and 205*d* may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices that utilize the application service 225 and/or the writing assistant service 190. Furthermore, in some implementations, the application functionality provided by the application service 225 is implemented by a native application installed on the client devices 205*a*, 205*b*, 205*c*, and 205*d*, and the client devices 205*a*, 205*b*, 205*c*, and 205*d* communicate directly with the writing assistant service 190 over a network connection.

In some implementations, the writing assistant service 190, or at least a portion of the functionality thereof, is implemented by the application services 225 to provide writing assistant-related services for users of the application services. In other implementations, the writing assistant service 190, or at least a portion of the functionality thereof, is implemented by a native application on the client devices 205*a*-205*d*.

Figure 3:
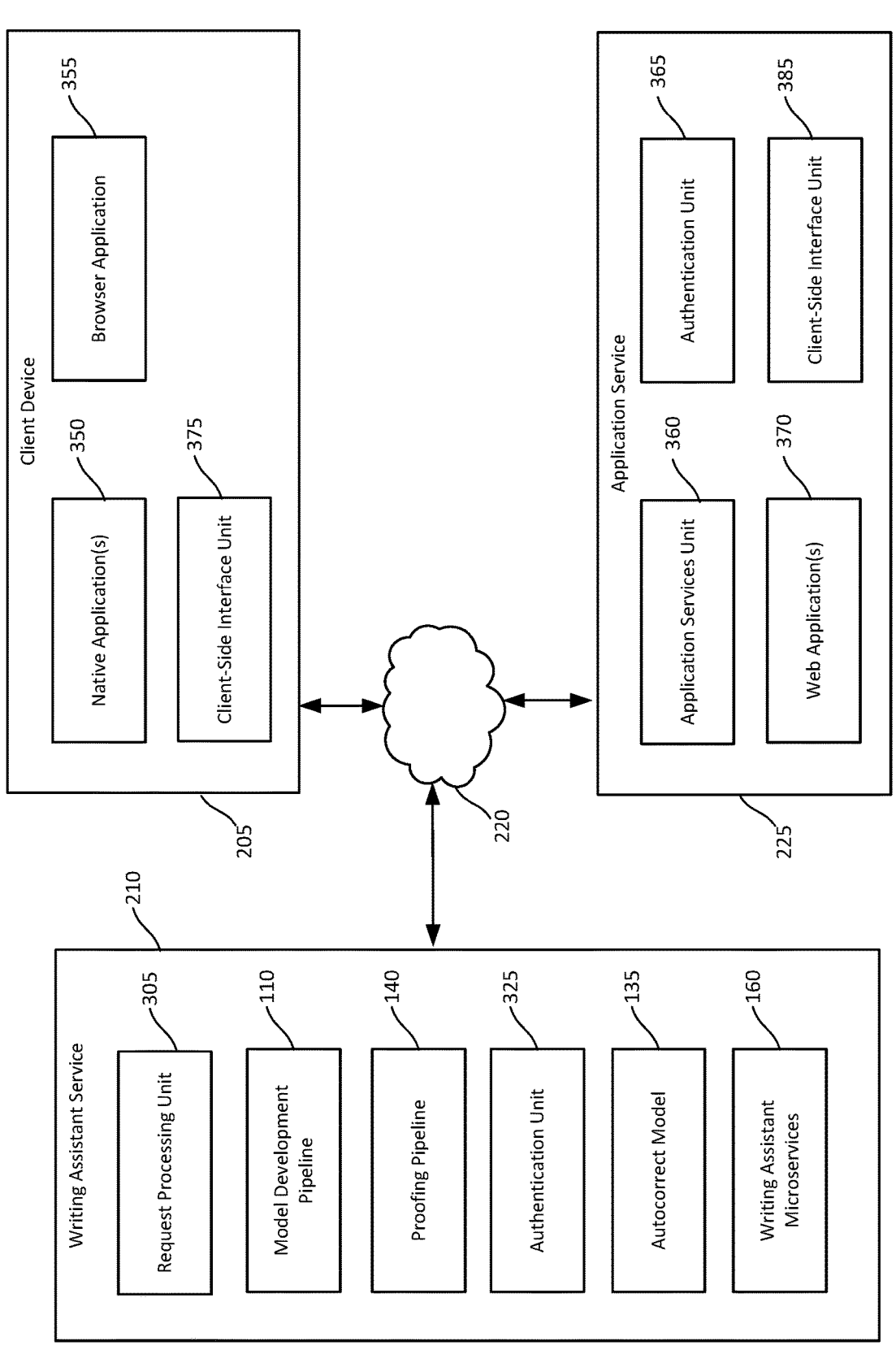
FIG. 3 is a diagram showing additional features of the writing assistant service, the client device, and the application service shown in FIG. 2.

FIG. 3 is a diagram showing additional features of the writing assistant service 190, the client device 205, and the application service 225. The writing assistant service 190 includes a request processing unit 305 and an authentication unit 325. The writing assistant service 190 also includes the model development pipeline 110, the proofing pipeline 140, the autocorrect model 135, and the writing assistant microservices 160 shown in FIG. 1.

The request processing unit 305 receives feedback and/or textual content to be analyzed from the client-side interface unit 105. The request processing unit 305 also sends suggestions and/or autocorrected textual content to the client-side interface unit 105. The request processing unit 305 provides the feedback to the model development pipeline 110 as discussed with respect to FIG. 1. The request processing unit 305 provides the textual content to the proofing pipeline 140 for analysis.

The authentication unit 325 provides functionality for verifying whether users are permitted to access the services provided by the writing assistant service 190. In some implementations, the authentication unit 325 provides functionality for receiving authentication credentials for the users from their respective client device 205 and/or from the application service 225. The authentication unit 325 may be configured to verify that the authentication credentials are valid and permit the users to access the services provided by the writing assistant service 190 responsive to the authentication credentials being valid.

The application service 225 includes an application services unit 360, an authentication unit 365, a web application 370, and a client-side interface unit 385. The application services unit 360 provides functionality for users to consume, create, share, collaborate on, and/or modify various types of textual content including textual content that may be analyzed by the writing assistant service 190. The application services unit 360 may utilize the writing assistant service 190 to analyze textual content being authored or edited by a user of the client device 205. In some implementations, the application services unit 360 provides a web-based application 370 to enable users to access at least a portion of the services provided by the application service 225. In other implementations, users may access the services provided by the application service 225 via one or more native applications 350 installed on the client device 205. The application services unit 360 may in turn obtain the services provided by the writing assistant service 190.

The authentication unit 365 provides functionality for verifying whether users are permitted to access the services provided by the application service 225 and/or the writing assistant service 190. In some implementations, the authentication unit 365 provides functionality for receiving authentication credentials for the users from their respective client device 205. In such implementations, the authentication unit 365 verifies that the authentication credentials are valid and permit the users to access the services and/or documents provided by the application service 225 and/or the writing assistant service 190, responsive to the authentication credentials being valid.

The client device 205 may include one or more native applications 350 and/or a browser application 355. In some implementations, the one or more native applications 350 includes a native application configured to communicate with the application service 225 to enable users to consume, create, share, collaborate on, and/or modify textual content using the services provided by the application service 225. In some implementations, the one or more native applications 350 includes a native application configured to communicate with the writing assistant service 190. In such implementations, the native application provides an interface for users to interact with the writing assistant service 190 and/or the application service 225.

The browser application 355 is an application for accessing and viewing web-based content, the web-based content may be provided by the application service 225 and/or the writing assistant service 190. The application service 225 may provide a web application 370 that enables users to consume, create, share, collaborate on, and/or modify content. A user of the client device 205 may access the web application 370 via the browser application 355, and the browser application 355 renders a user interface for interacting with the application services 225 in the browser application 355. The browser application 355 may be used to access the services provided by the application service 225 and/or the writing assistant service 190.

The application services 225 and/or the writing assistant service 190 may support both the one or more web-enabled native applications 350 and one or more web applications 370, and the users may choose which approach best suits their needs. The writing assistant service 190 may also provide support for the one or more native applications 350, the browser application 355, or both to provide functionality for a user of the client device 205 to obtain the services provided by the writing assistant service 190.

Figure 4A:
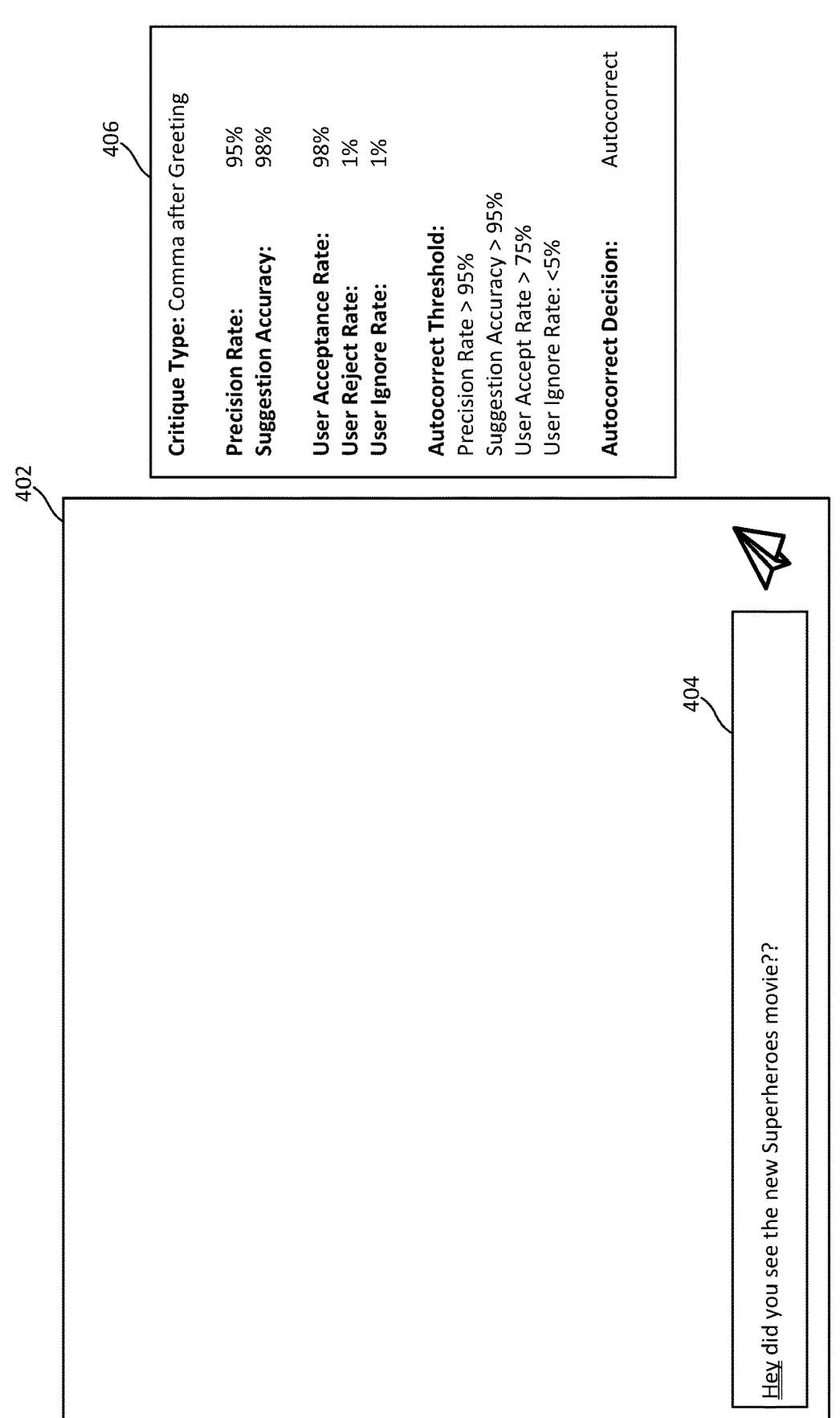
Figure 4B:
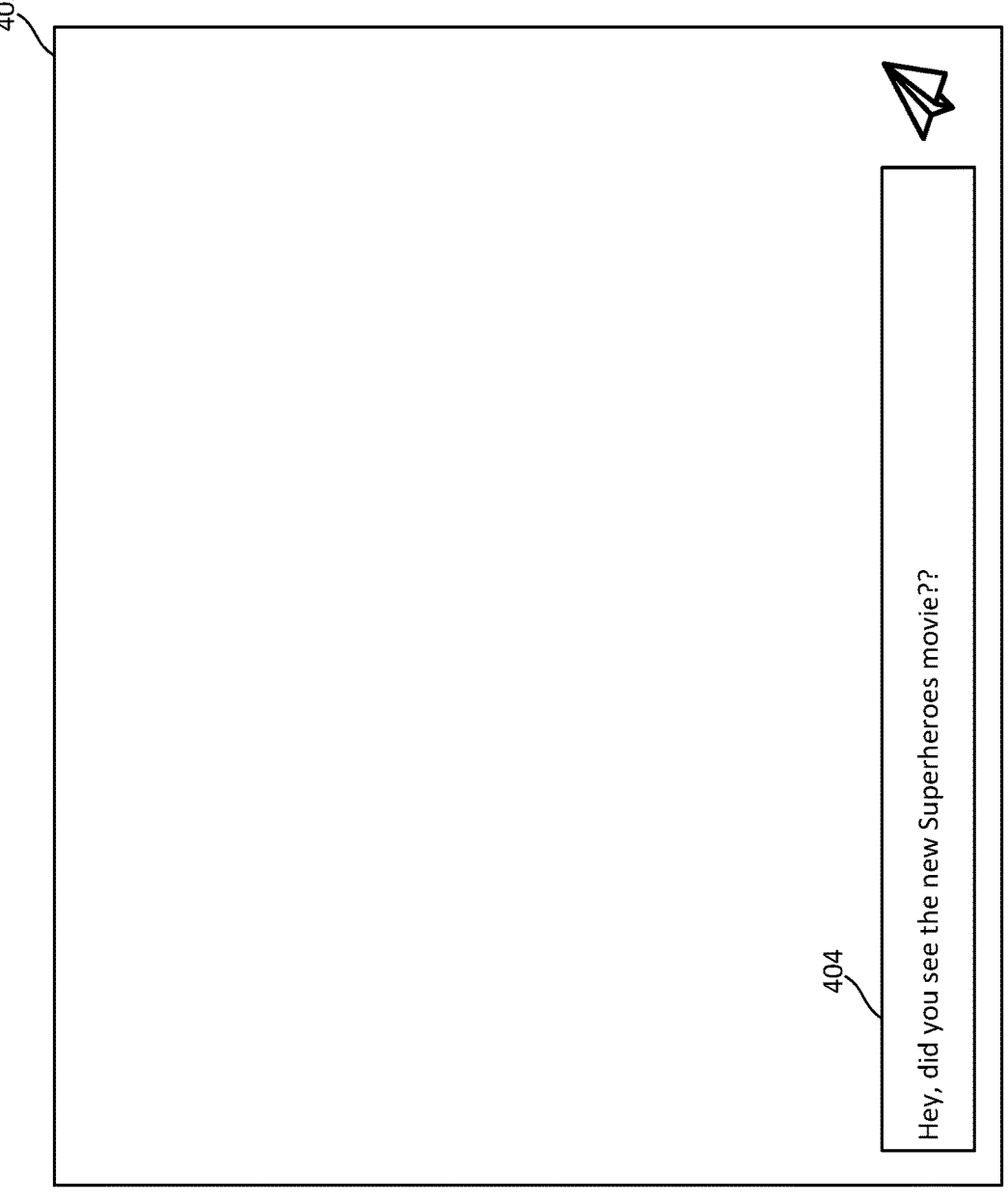

FIGS. 4A-4G show examples of user interfaces in which the autocorrect techniques provided herein may be implemented. The implementations shown in FIGS. 4A-4C show an example user interface 402 for a messaging application. The implementations shown in FIGS. 4D-4G shown an example user interface 420 for an email application. The user interface 402 and 420 may be generated by the native application 350 of the client device 205 or the web application 370 of the application service 225.

Figure 4E:
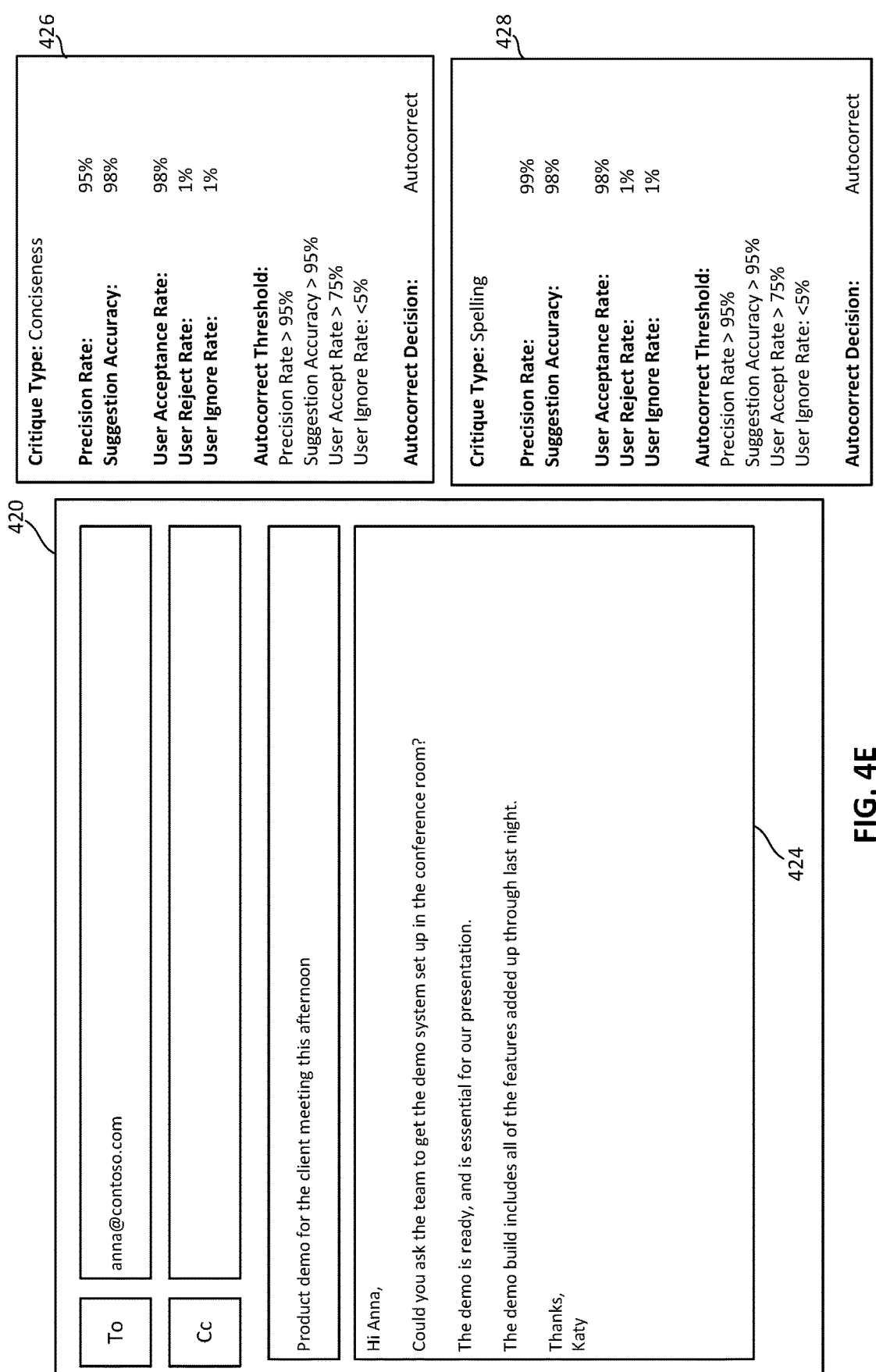

The examples shown in FIGS. 4A, 4C, and 4D show an example of the text messaging application utilizing the writing assistant service 190 to provide suggested improvements to the textual content of the text messages in which the context adaptive writing assistant functionality is disabled. The examples shown in FIGS. 4B and 4E show an example of the text messaging application that is utilizing the writing assistant services provided by the writing assistant service 190. The writing assistant service 190 provides suggestions for improving textual content of the messages being written in the messaging application and/or autocorrects the textual content according to the techniques provided herein. In situations where the user likely to have accepted a suggested improvement to the textual content of a message, the precision rate indicates that the writing assistant service 190 correctly detected the error in the textual content or a potential improvement to the textual content, and the suggestion accuracy indicates that the writing assistant service 190 has provided an appropriate suggestion for the error or potential improvement to the textual content. A technical benefit of this approach is that the writing assistant provides less notifications that may distract the user and interrupt the user workflow.

The user interface 402 shown in FIG. 4A includes a text entry field 404 in which the user can enter a text message to one or more recipients. The text of these text messages are sent to the writing assistant service 190 for analysis by the client-side interface unit 105. In the example shown in FIG. 4A, the writing assistant service 190 has detected an error in the textual content of the message. The error is a missing comma after the greeting "Hey" in text message. The proofing pipeline 140 of the writing assistant service 190 analyzes the textual content as discussed in the preceding examples to identify a candidate suggestion for correcting the error. The autocorrect determination unit 150 then queries the autocorrect model 135 to determine whether the writing assistant service 190 can autocorrect the detected error or the candidate suggestion for correcting the error should be presented to the user to allow the user to decide whether to accept, reject, or ignore the suggestion.

The autocorrect information 406 shown in FIG. 4A shows example autocorrection determination information 406 used by the writing assistant service 190 to determine whether the writing assistant service 190 is permitted to autocorrect textual content with the candidate suggestion. In the example shown in FIG. 4A, the critique type is the "comma after greeting" critique type. The precision rate associated with this suggestion category is 95%, the suggestion accuracy is 98%, the user acceptance rate is 98%, the user reject rate is 1%, and the user ignore rate is 1% for this issue. The autocorrect threshold for this example includes a precision rate of greater than 95%, a suggestion accuracy of greater than 95%, a user acceptance rate of greater than 75%, and a user ignore rate of less than 5%. In this example implementation, the comma after greeting suggestion category satisfies the autocorrect threshold. Therefore, the writing assistant service 190 is permitted to autocorrect the issue without presenting a suggestion for correcting the issue to the user and receiving user input on that suggestion. FIG. 4B shows the textual content of the text entry field 404 after the autocorrect has been performed.

The autocorrection determination information 406 would typically be maintained internally by the writing assistant service 190 and would not be presented to the user on the user interface 402. The autocorrection determination information 406 is provided in FIG. 4A to show an example of the information that may be used by the writing assistant service 190 to determine whether autocorrection is appropriate.

FIG. 4C shows another example in which the autocorrect information 406 indicates that the writing assistant service 190 is not permitted to autocorrect the comma after greeting suggestion category. In the example shown in FIG. 4C, the precision rate and the accuracy rate for the suggestion category fall below the autocorrect threshold. The precision rate associated with this suggestion category is 93%, the suggestion accuracy is 94%, the user acceptance rate is 98%, the user reject rate is 1%, and the user ignore rate is 1% for this issue. The precision rate of 93% for the suggestion category falls below the autocorrect threshold precision rate of greater than 95% and the suggestion accuracy of 94% for this suggestion category falls below the autocorrect threshold suggestion accuracy of greater than 95%. In this example implementation, the comma after greeting suggestion category does not satisfy the autocorrect threshold. Therefore, the writing assistant service 190 presents the suggestion to the user in the suggestion pane 410.

In some implementations, the corresponding section of textual content associated with a suggested improvement is underlined, highlighted, or otherwise emphasized to provide a visual indication to the user that there is an associated suggested improvement. The positional information included with the suggested improvements is used to ensure that the correct portion of the textual content is emphasized to the user. The user may then interact with the emphasized text to cause the suggestion pane 410 with the suggested improvements to be displayed in some implementations. A technical benefit of this approach is that it reduces clutter on the user interface of the application by only displaying the suggested improvements with which the user interacts.

The suggestion pane 410 includes controls for the user to accept, reject, or ignore the suggestion provided. The model development pipeline 110 receives this feedback, analyzes the feedback, and may update the autocorrect model 135. The models used by the writing assistant microservices 160 may change over time. The performance evaluation unit 130 is configured to reevaluate the performance of the writing assistant microservices 160 periodically and to provide updated precision rate and suggestion accuracy information to the data analysis unit 125. The data analysis unit 125 uses this information to determine whether to update the autocorrect model 135. A technical benefit of this approach is that the autocorrect model 135 continues to automatically evolve as the user feedback regarding a particular correction changes over time and/or the performance of the NLP models changes over time.

FIGS. 4D-4G show an example of an example user interface 420 for an email application. The user interface 420 includes a content pane 424 in which the body of an email message can be authored. In the example shown in FIG. 4D, the text of the email includes grammar and spelling issues. The autocorrection determination information 426 is information used by the writing assistant service 190 to determine whether autocorrection is appropriate for the conciseness suggestion category. The autocorrection determination information 428 is information used by the writing assistant service 190 to determine whether autocorrection is appropriate for the spelling suggestion category. In the example shown in FIG. 4D, the autocorrect threshold is met for both the conciseness suggestion and the spelling suggestion, and the writing assistant service 190 autocorrects the textual content of the message as shown in FIG. 4E.

Figure 4F:
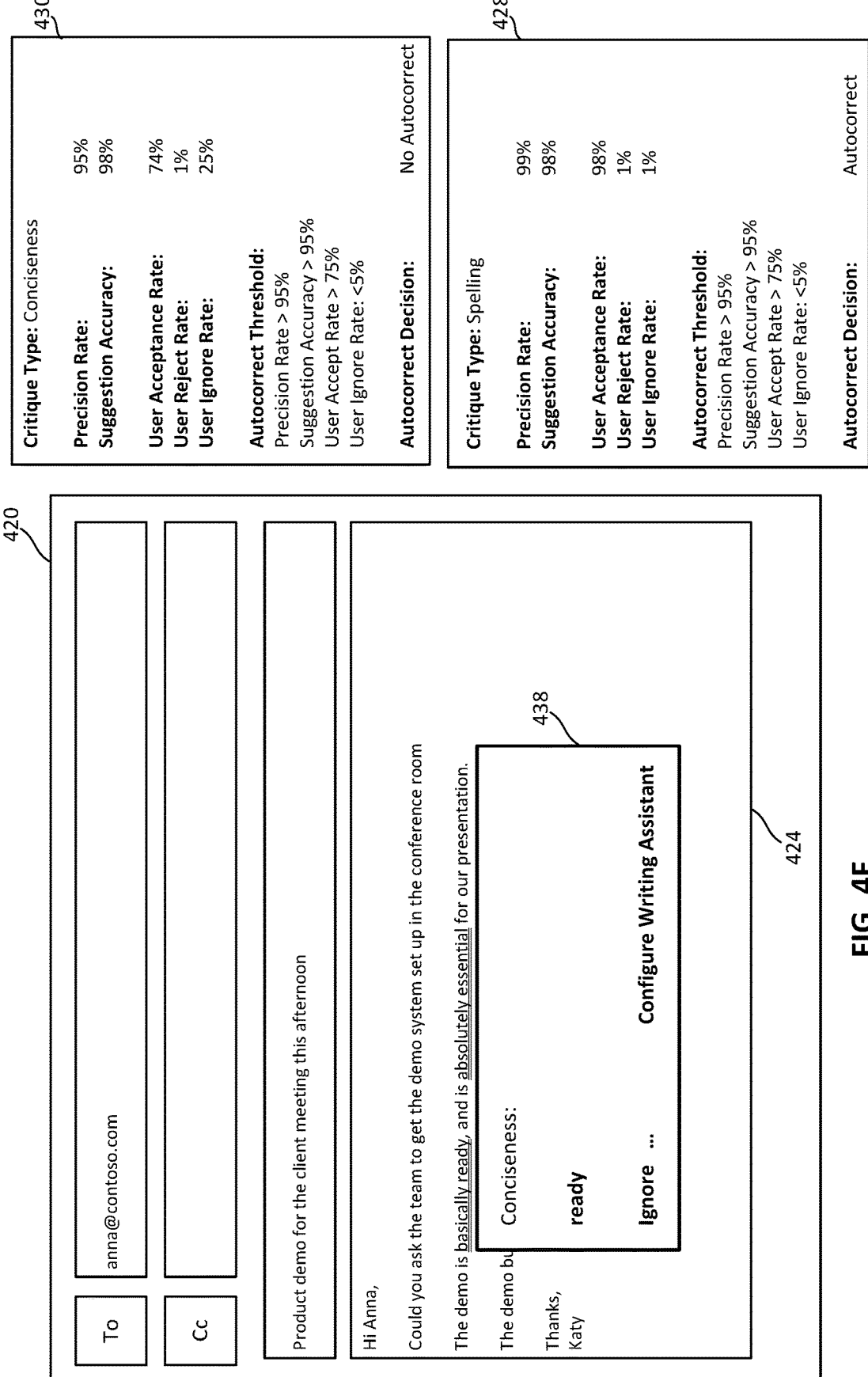

FIGS. 4F and 4G show examples in which one of the categories of candidate suggestions can be autocorrected by the writing assistant service 190. In FIG. 4F, the autocorrect information 430 for the conciseness category does not satisfy the autocorrect threshold, because the user acceptance rate is too low. However, the autocorrect information 428 for the spelling category indicates that the writing assistant service 190 can autocorrect the spelling error in the text in this example. Accordingly, the autocorrected text with the spelling error corrected but with the grammar errors included is presented in the content pane 424, and the conciseness suggestions are highlighted to indicate that the user may click on or otherwise interact with the highlighted text to cause the suggestion pane 438 to be displayed. The suggestion pane 438 provides controls for the user accept, reject, or ignore the suggestion. In FIG. 4G, the autocorrect information 432 for the spelling suggestion category does not satisfy the autocorrect threshold, because the user acceptance rate is too low. However, the autocorrect information 426 for the conciseness suggestion category indicates that the writing assistant service 190 can autocorrect the grammar error in the text in this example. Accordingly, the autocorrected text with the grammar error corrected but with the spelling error included is presented in the content pane 424, and the spelling suggestion is highlighted to indicate that the user may click on or otherwise interact with the highlighted text to cause the suggestion pane 438 to be displayed.

The specific values for the precision rate, the suggestion accuracy, the user acceptance rate, the user rejection rate, the user ignore rate, and the autocorrection threshold values shown in FIGS. 4A-4G are non-limiting examples intended to illustrate the concepts herein. Other implementations may have different precision rates, suggestion accuracies, user acceptance rates, user rejection rates, user ignore rates, and autocorrection threshold values.

FIGS. 5A, 5B, 5C, and 5D are examples of data structures that are used to store data associated with the autocorrection features provided by the writing assistant service 190 in some implementations. The data structures shown in FIGS. 5A-5D are maintained in a persistent memory of writing assistant service 190. In some implementations, the persistent memory is implemented in a database that can be queried by the various components of the writing assistant service 190 that utilize the data to provide the services of the writing assistant service 190.

The feedback data structure 510 is populated with data obtained from the feedback sent by the client-side interface unit 105 to the writing assistant service 190 in response to the user accepting, rejecting, or ignoring a suggestion for correcting an error or improving the textual content provided by the writing assistant service 190. In the example implementation shown in FIG. 5A, the user feedback 505 includes a suggestion category and a user response indicator. In this example, the user response indicator is a numerical value of zero, one, or two, where a value of zero indicates an ignore response, a value of one indicates an accept response, and a value of two indicates a reject response. The feedback unit 115 uses the information from the feedback to populate the feedback data structure 510. The feedback unit 115 also adds a timestamp indicating when the feedback was received by writing assistant service 190.

FIG. 5B is an example of a data structure 515 for aggregate user acceptance data. The data structure 515 stores cumulative feedback totals for the feedback received from users in response to suggestions provided by the writing assistant service 190. The total number of responses for each suggestion category are included, as well as how may suggestions were accepted, rejected, and ignored by the users for that suggestion category. The values stored in the data structure 525 are determined by the data aggregation unit 120 in some implementations. Furthermore, in some implementations, the data aggregation unit 120 accumulates all the data from the feedback data structure 510 to generate the values stored in the data structure 515. In other implementations, the data aggregation unit 120 accumulates a subset of the data from the feedback data structure 510 to generate the values stored in the data structure 515. For example, the data aggregation unit 120 may select the data from the previous month, quarter, year, or other period of time to determine the cumulative values stored in the data structure 515. The data aggregation unit 120 may utilize the latter approach to ensure that the totals are reflective of current usage patterns of users and/or to reduce the computational complexity of the calculations by only selected a most recent subset of the feedback data. FIG. 5C is an example of a data structure 520 which is similar to the data structure 515, but the accept, reject, and ignore actions are expressed as a percentage of the total feedback.

FIG. 5D is an example of a data structure 525 that stores precision rate and suggestion accuracy values for each of the suggestion categories. The values stored in the data structure 525 by the performance evaluation unit 130. The performance evaluation unit 130 reevaluates these percentages by testing the performance of the writing assistant microservices 160 used to detect the errors or potential improvements associated with each suggestion category and generate the candidate suggestions for updating the textual content to address these issues.

FIG. 5E is an example of a data structure 530 that stores an indication whether autocorrection is permitted for each of the suggestion categories. The indication whether autocorrection is permitted is determined by the data analysis unit 125 in some implementations. The data analysis unit 125 is configured to redetermine these values periodically and/or in response to changes to the user feedback information and/or the precision rate and/or suggestion accuracy for each suggestion category.

FIG. 6A is an example flow chart of an example process 600 for providing suggestions for improving textual content. The process 600 can be implemented by the writing assistant service 190 shown in the preceding examples.

The process 600 includes an operation 605 of receiving textual content from a first application on a first client device 205 associated with a first user. As discussed in the preceding examples, a native application 350 on the client device 205 or an application provided by the application service 225 provide a user interface for authoring and/or editing the textual content. The textual content is sent to the writing assistant service 190 for analysis by the client-side interface unit 105.

The process 600 includes an operation 610 of analyzing the textual content using one or more natural language processing (NLP) models to identify one or more candidate suggestions for improving the textual content. The proofing pipeline 140 of the writing assistant service 190 sends the textual content received from the client-side interface unit 105 to the writing assistant microservices 160 for analysis. Each of the microservices implement an NLP model that is configured to identify errors or potential improvements in the textual content and to provide candidate suggestions to address these issues.

The process includes an operation 615 of determining that a first candidate suggestion of the one or more candidate suggestions is associated with a first suggestion category. The first suggestion category is associated with first model performance information indicative of the performance of a first NLP model of the one or more NLP models that generated the first candidate suggestion. The first suggestion category is also associated with first user acceptance information indicative of a user acceptance rate of previous candidate suggestions for the first suggestion category. In some implementations, the writing assistant microservices 160 provide the suggestion category for each candidate suggestion provided to the content check unit 145. In other implementations, the content check unit 145 determines the suggestion category associated with the suggestion candidate based on the microservice of the writing assistance microservice 160 from which the suggestion candidate was received. In yet other implementations, the content check unit 145 implements an NLP model trained to receive the candidate suggestions from the writing assistant microservices 160 and to output the suggestion category for the suggestion candidate.

The process includes an operation 620 of determining that the first model performance information and the first user acceptance information associated with the first suggestion category satisfy an autocorrect threshold criteria. In some implementations, the autocorrect determination unit 150 provides the suggestion category associated with each candidate suggestion to the autocorrect model 135 for analyses to determine whether the autocorrection is permitted for that suggestion category. The autocorrect model 135 provides an indication to the autocorrect determination unit 150 whether each of the candidate suggestions may be autocorrected. The candidate suggestions and the indications from the autocorrect model 135 are provided to the execute autocorrection unit 155 for processing.

The process includes an operation 625 of generating autocorrected textual content by updating the textual content based on the first candidate suggestion responsive to determining that the model performance threshold and the user acceptance information associated with the first suggestion category satisfy the autocorrect threshold criteria. The execute autocorrection unit 155 applies the candidate suggestions for suggestion categories associated with suggestion categories for which autocorrection is permitted.

The process includes an operation 630 of providing the autocorrected textual content to the first client device. The first client device displays the autocorrected textual content in the first application on the first client device and replaces the original textual content in the first application. A technical benefit of this approach is that the textual content that the user is authoring or modifying is automatically improved without interrupting the user workflow.

FIG. 6B is an example flow chart of an example process 650 for providing suggestions for improving textual content. The process 650 can be implemented by the writing assistant service 190 shown in the preceding examples to produce the autocorrection model 135. In some implementations, the process 650 is used to train the autocorrect model 135 used in the process 600 shown in FIG. 6A.

The process 650 includes an operation 655 of receiving textual content from a first application on a first client device 205 associated with a first user. As discussed in the preceding examples, a native application 350 on the client device 205 or an application provided by the application service 225 provide a user interface for authoring and/or editing the textual content. The textual content is sent to the writing assistant service 190 for analysis by the client-side interface unit 105.

The process 650 includes an operation 660 of analyzing the textual content using one or more NLP models to identify one or more candidate suggestions for improving the textual content. The proofing pipeline 140 of the writing assistant service 190 sends the textual content received from the client-side interface unit 105 to the writing assistant microservices 160 for analysis. Each of the microservices implement an NLP model that is configured to identify errors or potential improvements in the textual content and to provide candidate suggestions to address these issues.

The process 650 includes an operation 665 of sending the one or more candidate suggestions to the first client device. During the process of developing the autocorrect model 135, the proofing pipeline 140 sends the candidate suggestions to the first client device for presentation the user, and the user may accept, reject, or ignore these suggestions. No autocorrection is performed until sufficient user feedback is received to determine the user acceptance rates for the suggestion categories.

The process 650 includes an operation 670 of receiving feedback from the first client device comprising user acceptance information associated with the one or more candidate suggestions and an operation 675 of aggregating the user acceptance information included in the feedback with historical user acceptance information to obtain aggregated user acceptance information. As discussed in the preceding examples, the feedback unit 115 receives the feedback from the client-side interface unit 105 and the data aggregation unit 120 aggregates the feedback data. The feedback data is aggregated with historical user acceptance data that was previously received from users accepting, rejecting, or ignoring candidate suggestions provided by the writing assistant service 190.

The process 650 includes an operation 680 of obtaining model performance information associated with the one or more NLP models. As discussed in the preceding examples, the performance evaluation unit 130 obtains performance information for the various NLP models used by the writing assistant microservices 160 to analyze the textual content.

The process 650 includes an operation 685 of analyzing the aggregate user acceptance information and the model performance information to determine whether aggregate user acceptance information and the model performance information satisfies autocorrect threshold criteria. The data analysis unit 125 analyzes the aggregate user acceptance information and the model performance information to whether autocorrection of the textual content is appropriate for the various suggestion categories for which feedback has been received.

The process 650 includes an operation 690 of training an autocorrect model based on the determination whether the aggregate user acceptance information and the model performance information satisfies the autocorrect threshold criteria. The data analysis unit 125 updates the autocorrect model 135 as discussed in the preceding examples. The autocorrect model 135 is trained to receive a suggestion category as an input and the autocorrect model 135 outputs an indication whether autocorrection is permitted for candidate suggestions of that suggestion category.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
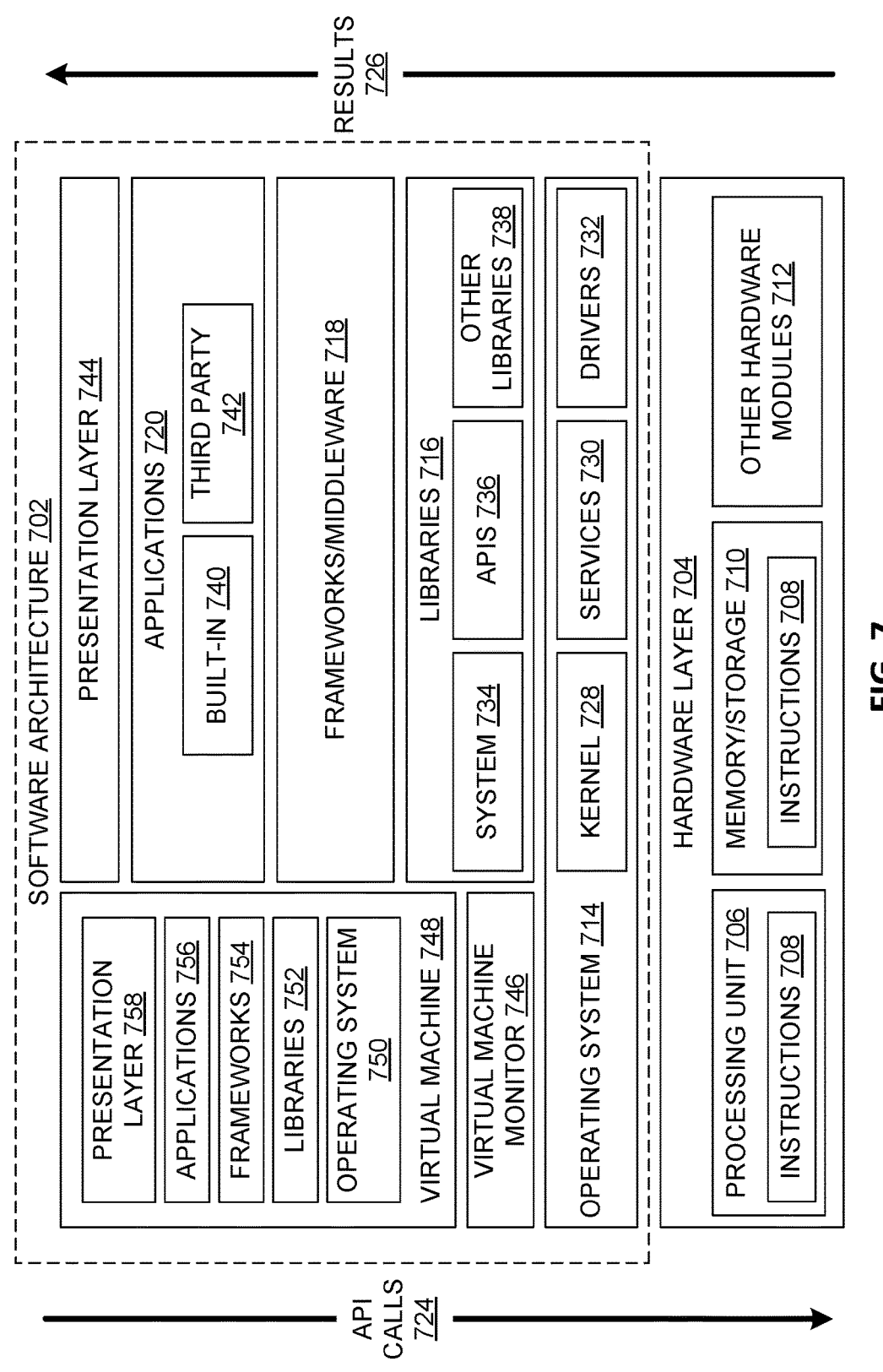
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/ modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
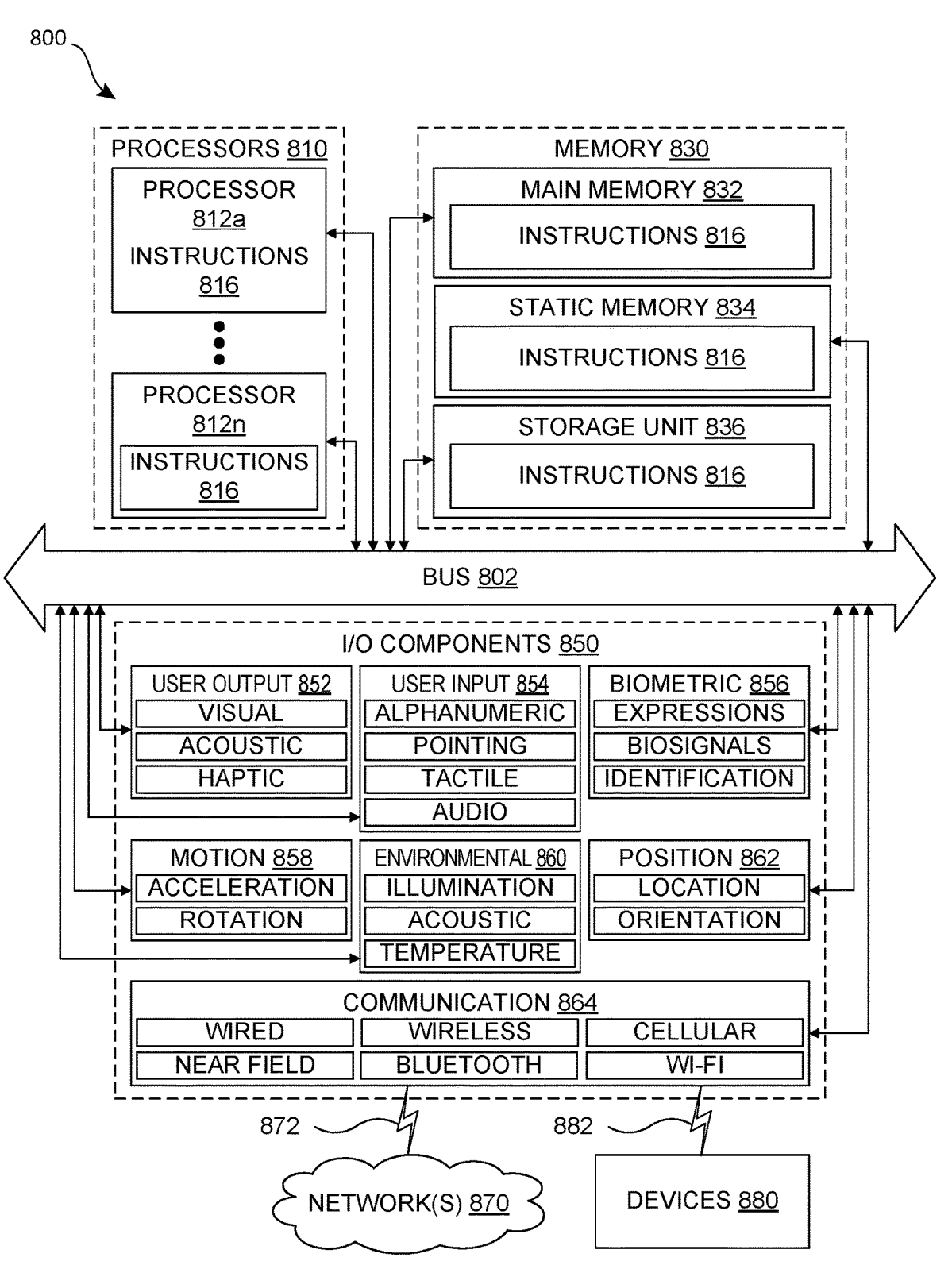
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   receiving user acceptance data at a model training pipeline, the user acceptance data indicating whether users have accepted autocorrections to textual content suggested by a writing assistant configured to provide suggestions for improving the textual content, each autocorrection being associated with a suggestion category;
   aggregating the user acceptance data by suggestion category using the model training pipeline to generate aggregated user acceptance data;
   training an autocorrect model using the model training pipeline based on the user acceptance data to receive a suggestion category and to output an indication whether the writing assistant can automatically apply autocorrections for the suggestion category, the model training pipeline training the autocorrect model to output an indication that the writing assistant can autocorrect for a respective suggestion category responsive to the aggregated user acceptance data indicating that the respective suggestion category satisfies an autocorrection threshold;
   receiving textual content from a first application on a first client device associated with a first user for analysis by the writing assistant;
   analyzing the textual content using one or more natural language processing (NLP) models to identify one or more candidate suggestions for improving the textual content;
   determining that a first candidate suggestion of the one or more candidate suggestions is associated with a first suggestion category;
   providing the first suggestion category as an input to the autocorrect model to obtain an indication whether the writing assistant can autocorrect the textual content by automatically applying the first candidate suggestion;
   generating autocorrected textual content by updating the textual content based on the first candidate suggestion responsive to the autocorrect model indicating that the writing assistant can autocorrect the textual content; and
   providing the autocorrected textual content to the first client device.

2. The data processing system of claim 1, wherein the first candidate suggestion is associated with a precision rate indicative of a confidence that an error or potential improvement to the textual content has been correctly detected.

3. The data processing system of claim 2, wherein the first candidate suggestion is associated with a suggestion accuracy indicative of a confidence that the first candidate suggestion is an appropriate suggestion for addressing an error or potential improvement to the textual content.

4. The data processing system of claim 1, wherein the machine-readable medium includes instructions configured to cause the processor to perform operations of:
   determining that second candidate suggestions of the one or more candidate suggestions are associated with a second suggestion category;
   providing the second suggestion category as an input to the autocorrect model to obtain a second indication whether the writing assistant can autocorrect the textual content by automatically applying the second candidate suggestions; and
   updating the textual content based on the second candidate suggestions responsive to the autocorrect model indicating that the writing assistant can autocorrect the textual content.

5. The data processing system of claim 4, wherein the machine-readable medium includes instructions configured to cause the processor to perform operations of:
   sending the second candidate suggestions to the first client device; and
   causing the first client device to display the autocorrected textual content and the second candidate suggestions in the first application on the first client device.

6. The data processing system of claim 5, wherein the machine-readable medium includes instructions configured to cause the processor to perform operations of:
   receiving feedback from the first client device comprising second user acceptance information associated with the second candidate suggestions;
   aggregating the second user acceptance information included in the feedback with historical user acceptance information to obtain second aggregate user acceptance information;
   obtaining updated second model performance information;
   analyzing the second aggregate user acceptance information and the updated second model performance information to determine whether second aggregate user acceptance information and the updated second model performance information satisfies autocorrect threshold criteria; and
   updating the autocorrect model responsive to the second aggregate user acceptance information and the updated second model performance information satisfying an autocorrect threshold criteria.

7. The data processing system of claim 6, wherein the autocorrect model is a rules-based model.

8. The data processing system of claim 6, wherein the autocorrect model is a machine learning model.

9. A data processing system comprising:
   a processor; and
   a machine-readable medium storing executable instructions that, when executed, cause the processor to perform operations comprising:
   receiving textual content from a first application on a first client device associated with a first user for analysis by a writing assistant configured to provide suggestions for improving the textual content;
   analyzing the textual content using one or more natural language processing models to identify one or more candidate suggestions for improving the textual content;
   causing the first application of the first client device to display the one or more candidate suggestions;
   receiving feedback from the first client device comprising user acceptance information associated with the one or more candidate suggestions;

aggregating the user acceptance information included in the feedback with historical user acceptance information to obtain aggregated user acceptance information;

obtaining model performance information associated with the one or more natural language processing models;

analyzing the aggregated user acceptance information and the model performance information to make a determination whether aggregate user acceptance information and the model performance information satisfies autocorrect threshold criteria; and training an autocorrect model based on the determination whether the aggregate user acceptance information and the model performance information satisfies the autocorrect threshold criteria, the autocorrect model being trained to receive as an input a suggestion category associated with a suggestion for improving textual content generated by the writing assistant and to output an indication whether the writing assistant can autocorrect the textual content based on the suggestion for improving the textual content.

10. The data processing system of claim 9, wherein the model performance information includes a precision rate indicative of a confidence that an error or potential improvement to the textual content has been correctly detected, and wherein the model performance information includes a suggestion accuracy indicative of a confidence that a candidate suggestion is an appropriate suggestion to address the error or potential improvement to the textual content.

11. The data processing system of claim 10, wherein the autocorrect model is selected from a rules-based model and a machine learning model.

12. A method implemented in a data processing system for providing suggestions for improving textual content, the method comprising:

receiving user acceptance data at a model training pipeline, the user acceptance data indicating whether users have accepted autocorrections to textual content suggested by a writing assistant configured to provide suggestions for improving the textual content, each autocorrection being associated with a suggestion category;

aggregating the user acceptance data by suggestion category using the model training pipeline to generate aggregated user acceptance data;

training an autocorrect model using the model training pipeline based on the user acceptance data to receive a suggestion category and to output an indication whether the writing assistant can automatically apply autocorrections for the suggestion category, the model training pipeline training the autocorrect model to output an indication that the writing assistant can autocorrect for a respective suggestion category responsive to the aggregated user acceptance data indicating that the respective suggestion category satisfies an autocorrection threshold;

receiving textual content from a first application on a first client device associated with a first user for analysis by the writing assistant;

analyzing the textual content using one or more natural language processing (NLP) models to identify one or more candidate suggestions for improving the textual content;

determining that a first candidate suggestion of the one or more candidate suggestions is associated with a first suggestion category;

providing the first suggestion category as an input to the autocorrect model to obtain an indication whether the writing assistant can autocorrect the textual content by automatically applying the first candidate suggestion;

generating autocorrected textual content by updating the textual content based on the first candidate suggestion responsive to the autocorrect model indicating that the writing assistant can autocorrect the textual content; and providing the autocorrected textual content to the first client device.

13. The method of claim 12, wherein the first candidate suggestion is associated with a precision rate indicative of a confidence that an error or potential improvement to the textual content has been correctly detected.

14. The method of claim 13, wherein the first candidate suggestion is associated with a suggestion accuracy indicative of a confidence that the first candidate suggestion is an appropriate suggestion for addressing an error or potential improvement to the textual content.

15. The method of claim 12, further comprising:

determining that second candidate suggestions of the one or more candidate suggestions are associated with a second suggestion category;

providing the second suggestion category as an input to the autocorrect model to obtain a second indication whether the writing assistant can autocorrect the textual content by automatically applying the second candidate suggestions; and updating the textual content based on the second candidate suggestions responsive to the autocorrect model indicating that the writing assistant can autocorrect the textual content.

16. The method of claim 15, further comprising:

sending the second candidate suggestions to the first client device; and causing the first client device to display the autocorrected textual content and the second candidate suggestions in the first application on the first client device.

17. The method of claim 16, further comprising:

receiving feedback from the first client device comprising second user acceptance information associated with the second candidate suggestions;

aggregating the second user acceptance information included in the feedback with historical user acceptance information to obtain second aggregate user acceptance information;

obtaining updated second model performance information;

analyzing the second aggregate user acceptance information and the updated second model performance information to determine whether second aggregate user acceptance information and the updated second model performance information satisfies autocorrect threshold criteria; and updating the autocorrect model responsive to the second aggregate user acceptance information and the updated second model performance information satisfying an autocorrect threshold criteria.

18. The method of claim 17, wherein the autocorrect model is selected from a rules-based model and a machine learning model.

* * * * *